United States Patent
Hasegawa et al.

(10) Patent No.: US 7,796,310 B2
(45) Date of Patent: Sep. 14, 2010

(54) IMAGE READING APPARATUS AND CONTROL METHOD THEREFOR, AS WELL AS STORAGE MEDIUM

(75) Inventors: Yoji Hasegawa, Chichibu (JP); Minoru Sashida, Ageo (JP); Katsuhiko Okitsu, Tokyo (JP)

(73) Assignee: Canon Denshi Kabushiki Kaisha, Chichibu-Shi (JP)

( * ) Notice: Subject to any disclaimer, the term of this patent is extended or adjusted under 35 U.S.C. 154(b) by 0 days.

(21) Appl. No.: 12/259,605

(22) Filed: Oct. 28, 2008

(65) Prior Publication Data

US 2009/0109500 A1    Apr. 30, 2009

(30) Foreign Application Priority Data

Oct. 31, 2007    (JP) .............................. 2007-283478

(51) Int. Cl.
*H04N 1/04* (2006.01)
*H04N 1/40* (2006.01)

(52) U.S. Cl. ..................... 358/488; 358/496; 358/408; 358/461; 358/475

(58) Field of Classification Search ................. 358/488, 358/486, 496, 498, 475, 465, 505, 509, 461, 358/408, 474; 382/137, 135, 312, 318, 319, 382/274; 399/367, 371, 374; 250/234–236, 250/216, 559.1; 356/71, 72; 355/23, 24

See application file for complete search history.

(56) References Cited

U.S. PATENT DOCUMENTS

| 6,999,211 B2 * | 2/2006 | Sekiya et al. ............... 358/498 |
| 7,130,090 B2 * | 10/2006 | Reid ........................... 358/475 |
| 2007/0013976 A1 * | 1/2007 | Luo ........................... 358/498 |

FOREIGN PATENT DOCUMENTS

| JP | 6-339007 | 12/1994 |
| JP | 2001-285585 | 10/2001 |
| JP | 2002-281257 | 9/2002 |

* cited by examiner

*Primary Examiner*—Cheukfan Lee
(74) *Attorney, Agent, or Firm*—Fitzpatrick, Cella, Harper & Scinto

(57) ABSTRACT

An image reading apparatus capable of increasing the detection accuracy of the size of an original and eliminating the need for an image sensor dedicated to detection of the size of an original. A first reading unit has a first light source disposed on one side of a conveyance path of an original for emitting light to one surface of the original. A second reading unit has a second light source disposed on the other side of the conveyance path for emitting light to be received by the first reading unit, an optical opening for causing the light emitted from the second light source and subsequently received by the first reading unit to pass therethrough toward the first reading unit. The original is detected on the basis of the resultant output of the first reading unit upon receipt of the light emitted from the second light source.

13 Claims, 17 Drawing Sheets

IMAGE READING APPARATUS AND CONTROL METHOD THEREFOR, AS WELL AS STORAGE MEDIUM

BACKGROUND OF THE INVENTION

1. Field of the Invention

The present invention relates to an image reading apparatus, such as a scanner for reading the image of an original, and a control method therefor, as well as a storage medium.

2. Description of the Related Art

When reading the image of an original, a standardized size corresponding to the size of the original or the like is specified as a reading size for an image reading apparatus such as a scanner or the like. On the other hand, there is a growing demand for image reading of batch of originals in which originals of different sizes are mixed. Accordingly, there has been proposed an image reading apparatus having a function of automatically discriminating the size of an original being read.

This discrimination function is preferably used for performing image reading of batch of originals in which originals of different sizes are mixed. The discrimination function is not limited to this application but is effectively used also in a case where an original of a standardized size is read so as to eliminate the need for such efforts as selecting a size when reading an image. In general, the inherent color of an original is white or substantially white. Hence, there is known a method for detecting the image size by changing a background member arranged opposite to an image sensor to a black-colored background member and detecting a black part included in periphery of the read image data.

As an image size detecting method performed in a case where the color of a background member is set to white or substantially white, there has been proposed a method for discriminating the size of an original using a shadow produced by illumination (see Japanese Laid-Open Patent Publication (Kokai) No. 2001-285585, for example). In addition, there has been disclosed a configuration in which an illumination source and an image sensor are disposed opposite to each other across a conveyance path of originals, in order to detect the skew of an original (see Japanese Laid-Open Patent Publication (Kokai) No. H06-339007). Furthermore, there has been disclosed a method in which a read image based on reflected light and a transmissive image based on transmitted light are obtained using one illumination source and two image sensors arranged on both sides of the conveyance path of originals, thereby allowing removal of a show-through image developed in the read image using the transmissive image data (see Japanese Laid-Open Patent Publication (Kokai) No. 2002-281257, for example).

In Japanese Laid-Open Patent Publication (Kokai) No. 2001-285585 described above, however, since the size of an original is detected using information on the shadow produced by illumination, the accuracy of original size detection may degrade due to false operation if any black part is present in the outermost area of the original.

In addition, according to the methods disclosed in Japanese Laid-Open Patent Publication (Kokai) No. H06-339007 described above, though it is possible to identify the size of an original, there arises the need to arrange a dedicated image sensor or sensors, thus leading to an increase in the size and cost of an image reading apparatus. In addition, the methods disclosed in Japanese Laid-Open Patent Publication (Kokai) No. 2002-281257 described above, does not intend to identify the size of an original.

SUMMARY OF THE INVENTION

It is an object of present invention to provides an image reading apparatus, and a control method therefor, as well as a storage medium, capable of increasing the detection accuracy of the edge of an original. It is another object of present invention to eliminate the need for an image sensor dedicated to detection of the edge of an original, to thereby realize the downsizing of the image reading apparatus. It is still another object of present invention to realize the cost reduction of the image reading apparatus.

According to a first aspect of the present invention, there is provided an image reading apparatus comprising: a first reading unit disposed on one side of a conveyance path of an original and having a first light source for emitting light to one surface of the original, and adapted to receive the light emitted from the first light source and subsequently reflected at the one surface of the original and adapted to read an image of the original; a second reading unit disposed on the other side of the conveyance path and having a second light source for emitting light to be received by the first reading unit, an optical opening for causing the light emitted from the second light source and subsequently received by the first reading unit to pass therethrough toward the first reading unit, and a reference member disposed so as to be movable between a position at which the optical opening is closed and a position at which the optical opening opens and to be read by the first reading unit, and adapted to receive the light emitted from the second light source and subsequently reflected at the other surface of the original and adapted to read the image of the original; and a control unit adapted to provide a control of detecting the original on the basis of the resultant output of the first reading unit upon receipt of the light emitted from the second light source.

According to a second aspect of the present invention, there is provided an image reading apparatus comprising: a first reading unit disposed on one side of a conveyance path of an original and having a first light source for emitting light to one surface of the original, and adapted to receive the light emitted from the first light source and subsequently reflected at the one surface of the original and adapted to read an image of the original; a second reading unit disposed on the other side of the conveyance path having a second light source for emitting light to be received by the first reading unit, an optical opening for causing the light emitted from the second light source and subsequently received by the first reading unit to pass therethrough toward the first reading unit, and a reference member to be read by the first reading unit, and adapted to receive the light emitted from the second light source and subsequently reflected at the other surface of the original and adapted to read the image of the original; a moving unit adapted to move at least one of the first reading unit and the second reading unit so as to change a relative position of the first reading unit and the second reading unit; and a control unit adapted to control the moving unit to change the relative position between one relative position at which the optical opening is opposed to the first reading unit and the other relative position at which the reference member is opposed to first reading unit, and adapted to provide a control of detecting the original on the basis of the resultant output of said first reading unit upon receipt of the light having passed through said optical opening.

According to a third aspect of the present invention, there is provided an image reading apparatus comprising: a reading unit disposed on one side of a conveyance path of an original and having a first light source for emitting light to one surface of the original, and adapted to receive the light emitted from the first light source and subsequently reflected at the one surface of the original and adapted to read an image of the original; a second light source disposed on the other side of the conveyance path for emitting light to be received by the reading unit; a reference member disposed on an optical path from the second light source to the reading unit so as to cause the light emitted by the second light source to pass therethrough and to be read by the reading unit; and a control unit adapted to provide a control of detecting the original on the basis of the resultant output of the reading unit upon receipt of the light emitted from the second light source and subsequently having passed through the reference member.

According to a fourth aspect of the present invention, there is provided an image reading apparatus comprising: a reading unit disposed on one side of a conveyance path of an original and having a first light source for emitting light to one surface of the original and adapted to receive the light emitted from the first light source and subsequently reflected at the one surface of the original and adapted to read an image of the original; a second light source disposed on the other side of the conveyance path for emitting light to be received by the reading unit; a reference member disposed on an optical path from the second light source to the reading unit so as to be read by the reading unit; a black-colored member disposed so as to overlap with the reference member and formed of a light transmissive black material; and a moving unit adapted to move the reference member only or both of the reference member and the black-colored member, such that the reference member or the black-colored member is located at a position for blocking the light of the second light source.

According to a fifth aspect of the present invention, there is provided an image reading apparatus comprising: a reading unit disposed on one side of a conveyance path of an original and having a first light source for emitting light to one surface of the original, and adapted to receive the light emitted from the first light source and subsequently reflected at the one surface of the original and adapted to read an image of the original; and a second light source disposed on the other side of the conveyance path for emitting light to be received by the reading unit; a control unit adapted to provide a control of causing the second light source to emit the light except a period of time during which the reading unit receives the light emitted from the first light source to the original and adapted to provide a control of detecting the original on the basis of the resultant output of the reading unit upon receipt of the light emitted from the second light source.

According to a sixth aspect of the present invention, there is provided a method for controlling an image reading apparatus comprising a reading unit disposed on one side of a conveyance path of an original and having a first light source for emitting light to one surface of the original, and adapted to receive the light emitted from the first light source and subsequently reflected at the one surface of the original, and adapted to read the image of the original; and a second light source disposed on the other side of the conveyance path to emit light to be received by the reading unit, wherein the control method provides a control of controlling the second light source to emit the light except a period of time during which the reading unit receives the light emitted from the first light source to the original, and provides a control of detecting the original on the basis of the resultant output of the reading unit upon receipt of the light emitted from the second light source.

According to a seventh aspect of the present invention, there is provided a computer-readable storage medium storing a program for causing a computer to implement a method for controlling an image reading apparatus comprising a reading unit disposed on one side of a conveyance path of an original and having a first light source for emitting light to one surface of the original, and adapted to receive the light emitted from the first light source and subsequently reflected at the one surface of the original, and adapted to read the image of the original; and a second light source disposed on the other side of the conveyance path to emit light to be received by the reading unit, wherein the control method provides a control of controlling the second light source to emit the light except a period of time during which the reading unit receives the light emitted from the first light source to the original, and a control of detecting the original on the basis of the resultant output of the reading unit upon receipt of the light emitted from the second light source.

According to the present invention, it is possible to increase the detection accuracy of the size of an original and eliminate the need for an image sensor dedicated to detection of the size of the original, to thereby realize the downsizing and the cost reduction.

Further features and advantages of the present invention will become apparent from the following detailed description of exemplary embodiments with reference to the attached drawings.

DETAILED DESCRIPTION OF THE PREFERRED EMBODIMENTS

The present invention will now be described in detail with reference to the drawings showing preferred embodiment thereof.

Figure 1:
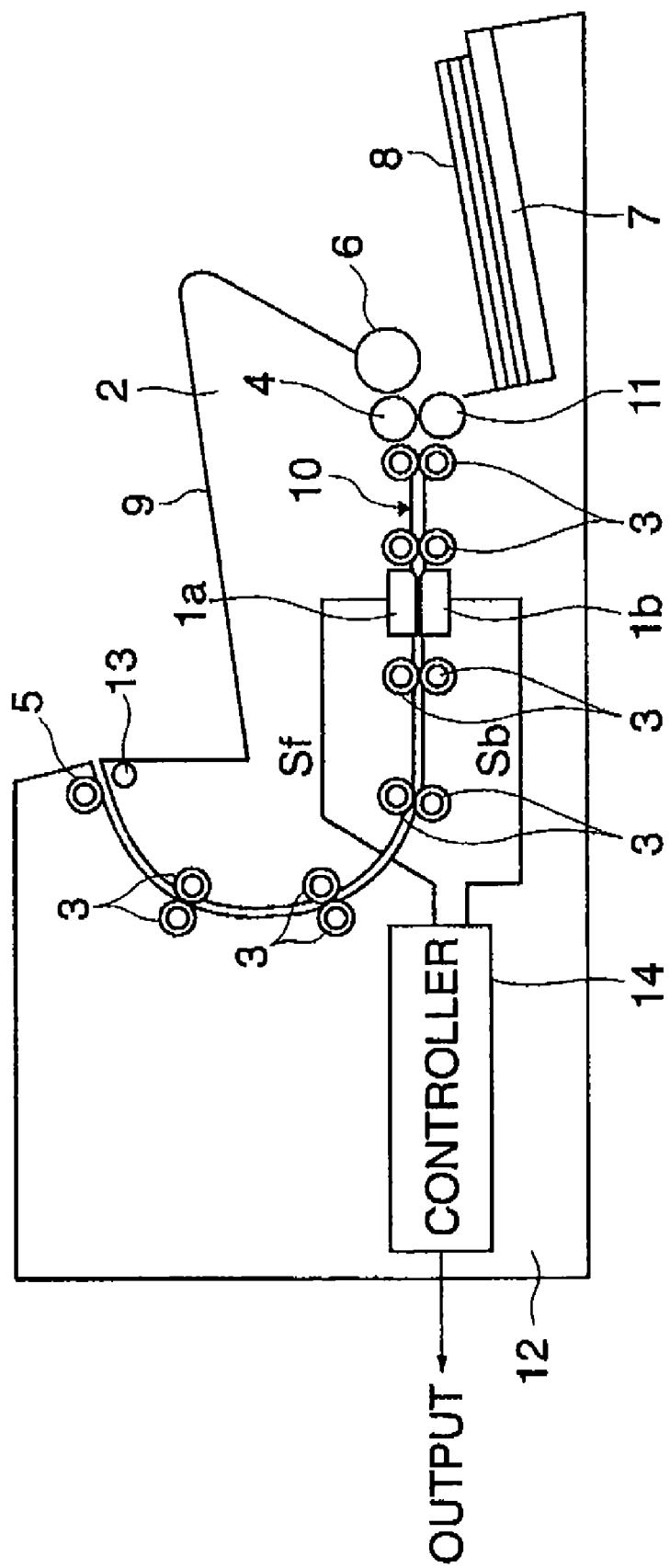
FIG. 1 is a cross-sectional view which is useful in explaining the configuration of an image reading apparatus in accordance with a first embodiment of the present invention.

FIG. 1 is a cross-sectional view which is useful in explaining an image reading apparatus in accordance with a first embodiment of the present invention.

An image reading apparatus in accordance with a first embodiment of the present invention is configured, as shown in FIG. 1, in such a manner that when an original table 7 rises and then an original 8 loaded on the original table 7 abuts to a pickup roller 6, the original 8 is picked up by the pickup roller 6 and fed by a feed roller 4.

If the pickup roller 6 picks up two or more originals 8 at a time, a separation roller 11 separates the originals to feed them one by one. Then, an image on a front surface (one surface) of the original 8 is read by a scanning assembly (reading unit) 1a and an image on a rear surface (the other surface) is read by a scanning assembly (reading unit) 1b. The scanning assemblies 1a and 1b are located in positions substantially opposite to each other across a conveyance path 10 of the originals 8. However, a reading position for the front surface of the original 8 and a reading position for the rear surface thereof are away from each other by a predetermined distance in the conveyance direction of the original 8.

Figure 2:
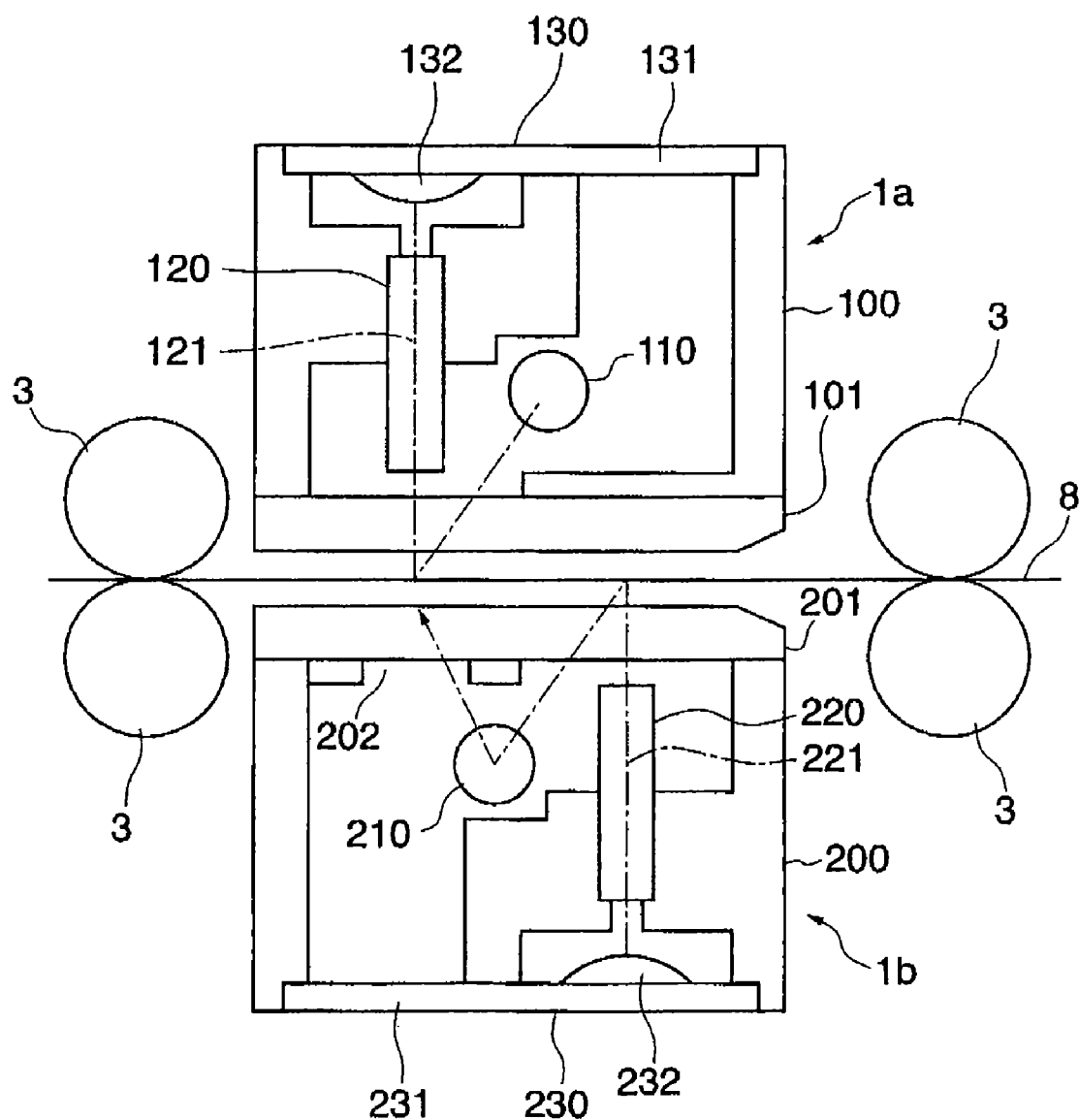
FIG. 2 is a cross-sectional view which is useful in explaining the configuration of scanning assemblies in FIG. 1.

At the scanning assembly 1a, scattered reflection light from the original 8 illuminated by a light source 110 (see FIG. 2) is caused by imaging optics to focus on an image sensor 130 (see FIG. 2). Then, an image processor of a controller 14 generates digital data on the basis of an electric signal photoelectrically converted and output by an image sensor 130, and subsequently subjects the digital data to image-processing to thereby obtain the image data.

Here, in the present embodiment, the outline of an original is detected using the image sensor 130 and the imaging optics 120 of the scanning assembly 1a, and also using a light source 210 (see FIG. 2) of the scanning assembly 1b, though details thereof are described later. Output signals sf and sb from the scanning assemblies 1a and 1b are output to the controller 14.

The original having passed through the scanning assemblies 1a and 1b is conveyed through the conveyance path 10 by conveying roller pairs 3 and subsequently is discharged to a discharge tray 9 by a discharge roller 5

When all of the originals loaded on the original table 7 are fed out, the original table 7 lowers to return to a home position. Moreover, an upper assembly 2 on which the conveyance roller 3, the feed roller 4 and the scanning assembly 1a are mounted is openable and closable around a hinge 13 with respect to a lower assembly 12.

When the upper assembly 2 is opened, the conveyance roller 3, the scanning assembly 1a, the scanning assembly 1b and the conveyance path 10 can be cleaned directly by operator. In addition, even if the original 8 is jammed in the conveyance path 10, the jammed original can be easily taken out by opening the upper assembly 2. The opening/closing of the upper assembly 2 is sensed by an open/close sensor (not shown). After checking that the upper assembly 2 is closed, the image reading apparatus enters a standby mode.

Next, the scanning assemblies 1a and 1b will be described in detail with reference to FIG. 2.

The scanning assembly 1a has a cover member 101, formed from transparent glass, resin or the like, mounted on a frame 100 on a side of the conveyance path 10. The frame 100 has arranged therein the light source 110, the imaging optics 120 and the image sensor 130. The image sensor 130 is composed of a light receiving element 132 and a PCB 131 equipped therewith, converts the reflected light from the original into an output signal, and outputs the signal.

The scanning assembly 1b has a cover member 201, formed from transparent glass, resin or the like, mounted on a frame 200 on a side of the conveyance path 10. The frame 200 has arranged therein a light source 210, imaging optics 220 and an image sensor 230. The image sensor 230 is composed of a light receiving element 232 and a PCB 231 equipped therewith, converts the reflected light from the original into an output signal, and outputs the signal.

In addition, the frame 200 has an optical opening 202 formed at a portion thereof facing the conveyance path 10, so as to be positioned on an optical axis 121 of the imaging optics 120 of the scanning assembly 1a. A part of light from the light source 210 passes through the optical opening 202 and enters the imaging optics 120 of the scanning assembly 1a. Then, the controller 14 performs detection process of the original 8 based on the resultant output of the light receiving element 132 upon light reception, i.e., based on an output signal provided by the photoelectric conversion element 132 upon receiving the light from the light source 210.

The present embodiment is exemplified by the fact that the light source 210 of the scanning assembly 1b arranged at a position substantially opposite to the light receiving element 132 of the scanning assembly 1a, but not limited thereto. For example, a light emitting element may be arranged at a position other than the position opposite to the light receiving element 132 and subsequently light from the light emitting element may be guided into the light receiving element 132 through a light guide (not shown). The light emitting element and the light guide described above may configure a second light source according to the present invention.

Furthermore, the present embodiment is exemplified by the fact that a part of light from the light source 210 passes through the optical opening 202 to directly enter the imaging optics 120 of the scanning assembly 1a, but not limited thereto. For example, as shown in FIG. 3, a reflecting surface 203 is disposed on the frame 200, so that a part of the light from the light source 210 is reflected by the reflecting surface 203 and enters the imaging optics 120.

Figure 3:
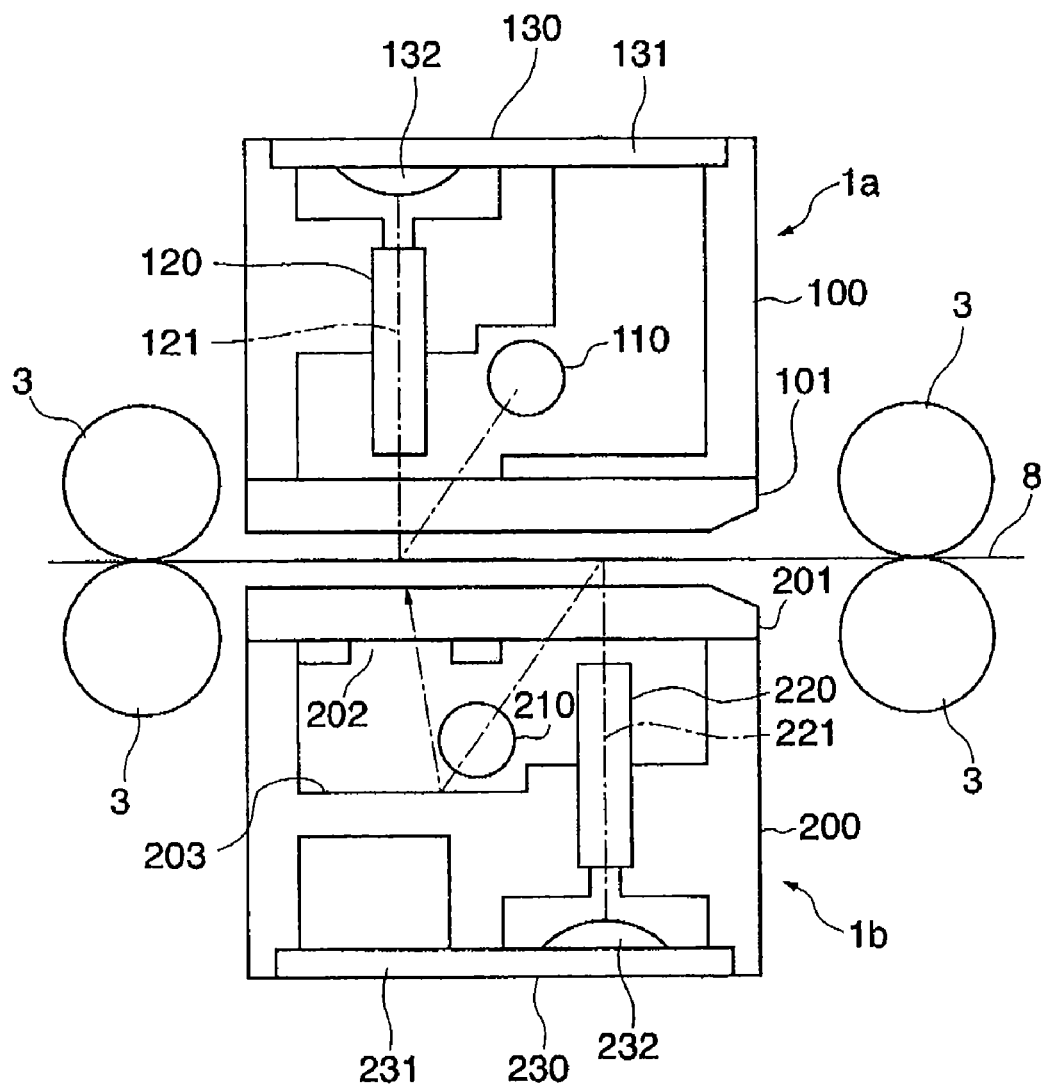
FIG. 3 is a cross-sectional view illustrating modified example of the scanning assemblies in FIG. 2.
Figure 4:
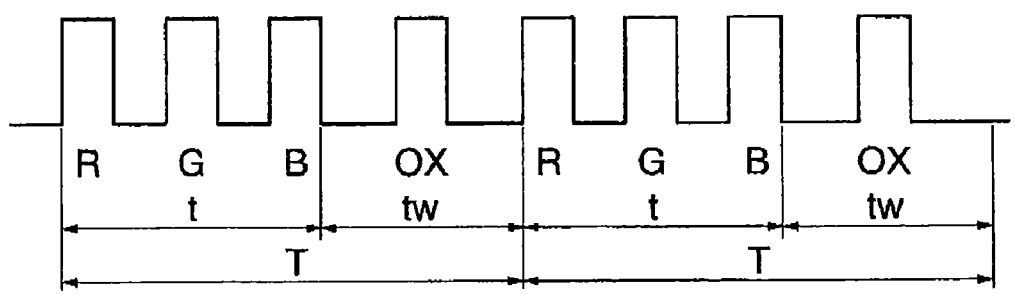
FIG. 4 is the timing chart for the output signal generation of the scanning assembly in FIG. 1 or 3.

FIG. 4 is a timing chart for the output signal generation of the scanning assembly 1a in FIG. 1 or 3.

First, as shown in FIG. 4, a three-color light source 110 composed of, for example, LEDs is turned on, one color at a time, in the order of R, G and B. Consequently, output signals respectively corresponding to the read information on red, green and blue are sequentially output from the image sensor 130 during a time "t". Thus, a single line of the read image is obtained based on the output signals.

On the other hand, there is provided a wait time "tw" before the start of reading the next line, by shortening the time "t" with respect to a time "T" required to convey the original 8 by a single line. Thus, the light source 210 of the opposed scanning assembly 1b is turned on at a time "OX" during this period of time "tw". If the original 8 does not block the light at this time, the light from the light source 210 passes through the conveyance path and reaches the imaging optics 120. If the light is blocked by the original 8, only a small quantity of light having transmitted through the original 8 reaches the imaging optics 120.

That is, the outline of the original 8 is projected onto the image sensor 130 through the imaging optics 120 like a silhouette. The image sensor 130 reads this image and provides an output signal. The controller 14 obtains a single line of a transmissive image on the basis of this output signal. Subsequently, the scanning assembly 1a starts reading the next line.

Note that if the controller 14 determines that all pixels in a given single line of the transmissive image have brightness levels higher than a predetermined threshold, then it recognizes that the original 8 does not exist at a reading position when reading this line. Also note that if the controller 14 determines that pixels having brightness levels lower than the threshold exist in the transmissive image, then it recognizes that pixels which have undergone such a change in brightness compared with preceding pixel passing through the threshold, for example, as outline pixels of the original. Repeating such processing as described above enables the controller 14 to obtain information on the read image and on the outline of the original across the full width and full length of the original 8.

Moreover, an LED to be turned on at the time "OX", among the red, green and blue LEDs of the light source 210, is preferably changed in a predetermined sequence, or at random. This makes it possible to prevent a specific LED, among the red, green and blue LEDs, from lighting over a too long period of time, thereby extending the service life of the light source.

By cutting off a background image present around the read original image from the read image on the basis of information on the outline of the original 8 thus acquired, it is possible to obtain an image favorably consistent with the outline of the original 8.

The above-described image processing has been explained by taking, as one example, a case in which the image processing is performed by the controller 14 of the image reading apparatus. Alternatively, information on the read image and on the outline of the original may be transferred to a host computer connected through a cable or the like and subsequently a part or the whole of the above-described image processing may be performed by the host computer to which the information has been transferred. Still alternatively, information on the transmissive image may also be transferred to the host computer and subsequently information on the outline of the original may be acquired by the host computer.

As described heretofore, according to the present invention, the outline of the original 8 is detected on the basis of its transmissive image, thereby increasing the detection accuracy of the original 8.

In addition, it is possible to obtain the transmissive image of the original 8 by utilizing the light source 210 of the scanning assembly 1b for reading the image on the rear surface image of the original 8, thereby eliminating the need for another image sensor dedicated to detection of the size of the original or an additional light source, thereby making it possible to realize the downsizing and the cost reduction.

The present embodiment is exemplified by the fact that the scanning assemblies 1a and 1b are arranged so as to read both surfaces of the original 8, only either one of the scanning assemblies 1a and 1b may be arranged if the image reading apparatus does not have a function of reading both surfaces of the original 8. In this case, a light source (second light source) used exclusively for obtaining the transmissive image of the original is arranged at a position opposite to the scanning assembly 1a (or 1b) across the conveyance path 10 thereof.

Figure 5:
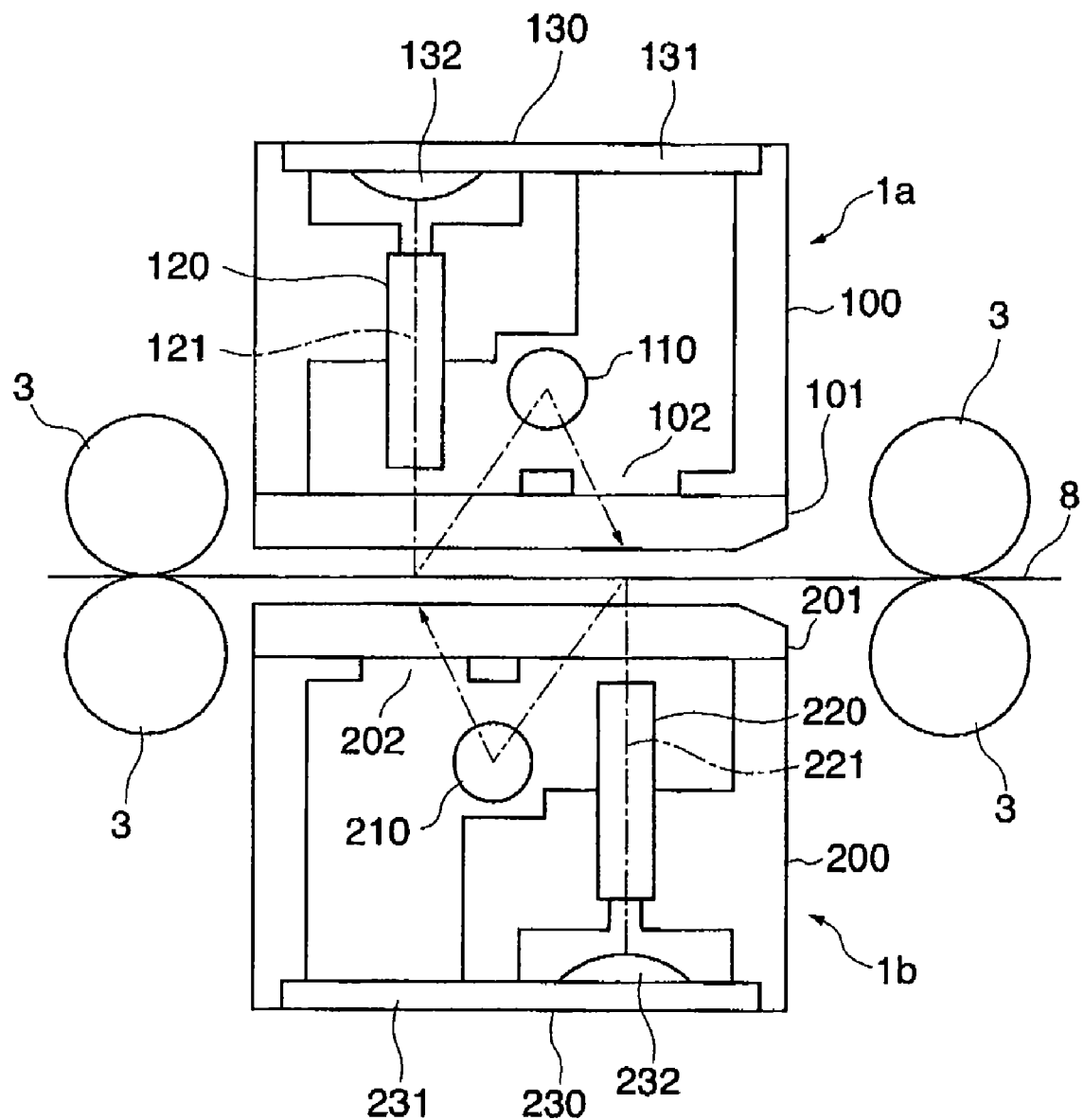
FIG. 5 is a cross-sectional view illustrating another modified example of the scanning assemblies of FIG. 2.
Figure 6:
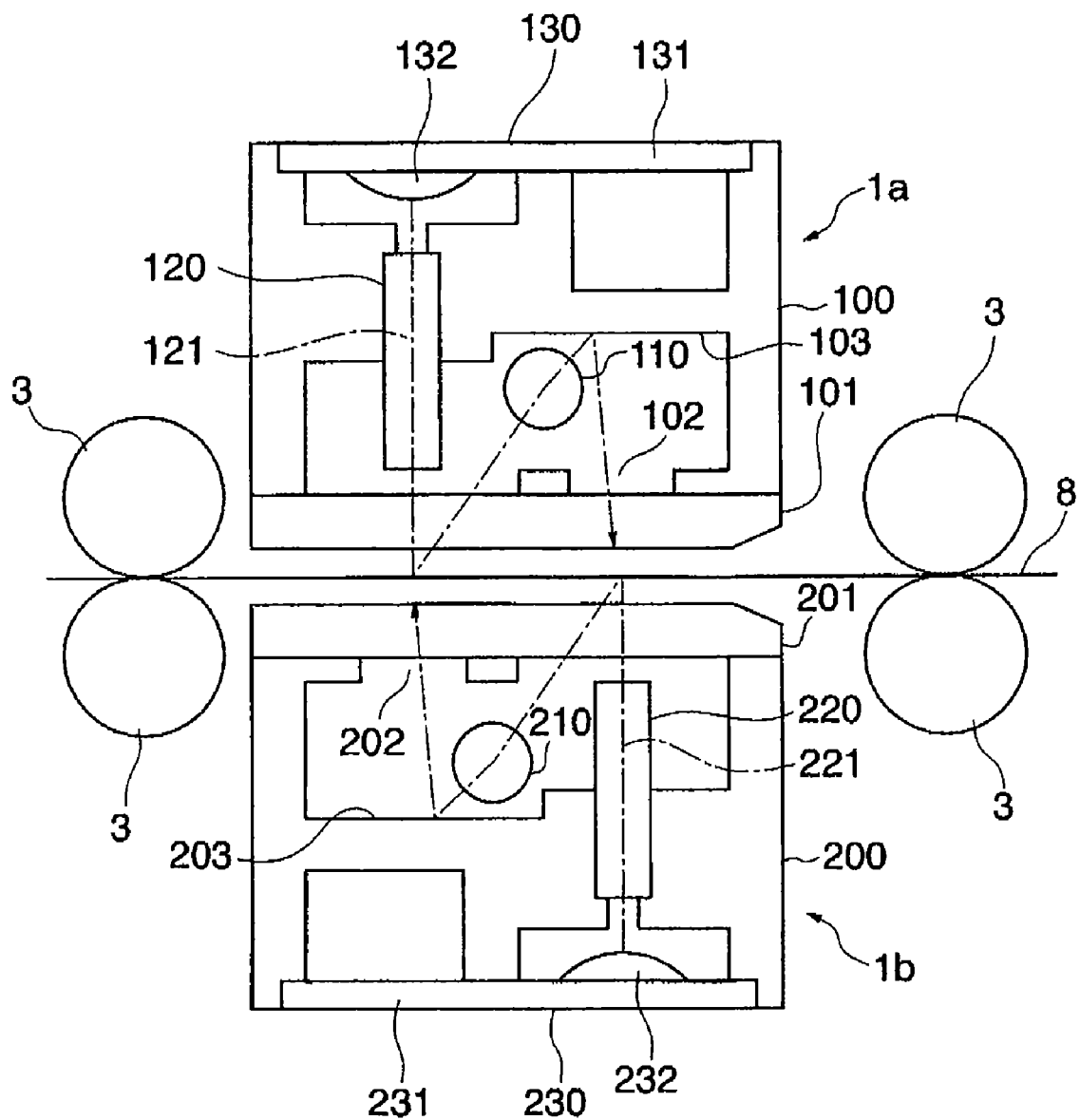
FIG. 6 is a cross-sectional view illustrating a modified example of the scanning assemblies of FIG. 5.

Furthermore, the present embodiment is exemplified by the fact that the optical opening 202 is disposed on the scanning assembly 1b; however, the optical opening may be disposed on a side of the scanning assembly 1a. Alternatively, as shown in FIG. 5, the optical openings 102 and 202 may be respectively disposed on the scanning assemblies 1a and 1b. Still further, as shown in FIG. 6, the reflecting surfaces 103 and 203 are respectively disposed on the frames 100 and 200 so that a part of light from the light sources 110 and 210 are respectively reflected by the reflecting surfaces 103 and 203 and enter the imaging optics 220 and 120.

If the optical openings 102 and 202 are respectively disposed on the scanning assemblies 1a and 1b and information on the outline of the original 8 is acquired separately for the front and rear surfaces thereof, it is possible to perform a process of clipping the images of the original from each of the read front and rear side images thereof without being affected by errors in the located positions of the scanning assemblies 1a and 1b. In addition, it is possible to perform such a process of clipping the images of the original as described above concurrently with the simultaneous reading of both surface images while conveying the original once.

Furthermore, if this configuration is provided in both scanning assemblies, even faster image reading is possible by operating the other scanning assembly as a sensor dedicated to detection of the outline of the original when reading arbitrarily selected one of the front and rear surfaces.

Next, a description will be made of an image reading apparatus according to a second embodiment of the present invention, with reference to FIG. 7. An image reading apparatus according to the present embodiment is identical in configuration with the above-described first embodiment, so that similar elements are denoted by same reference numerals in the drawings, and the description thereof will be omitted.

In the present embodiment, cold-cathode fluorescent lamps suitable for use in continuous lighting are used as the light sources 110 and 210 of scanning assemblies 1a and 1b.

In this case, control needs to be performed in such a manner that light reaches to the imaging optics 120 of the scanning assembly 1a from the optical opening 202 of the scanning assembly 1b only when necessary, since the light source 210 is used in continuous lighting.

Figure 7:
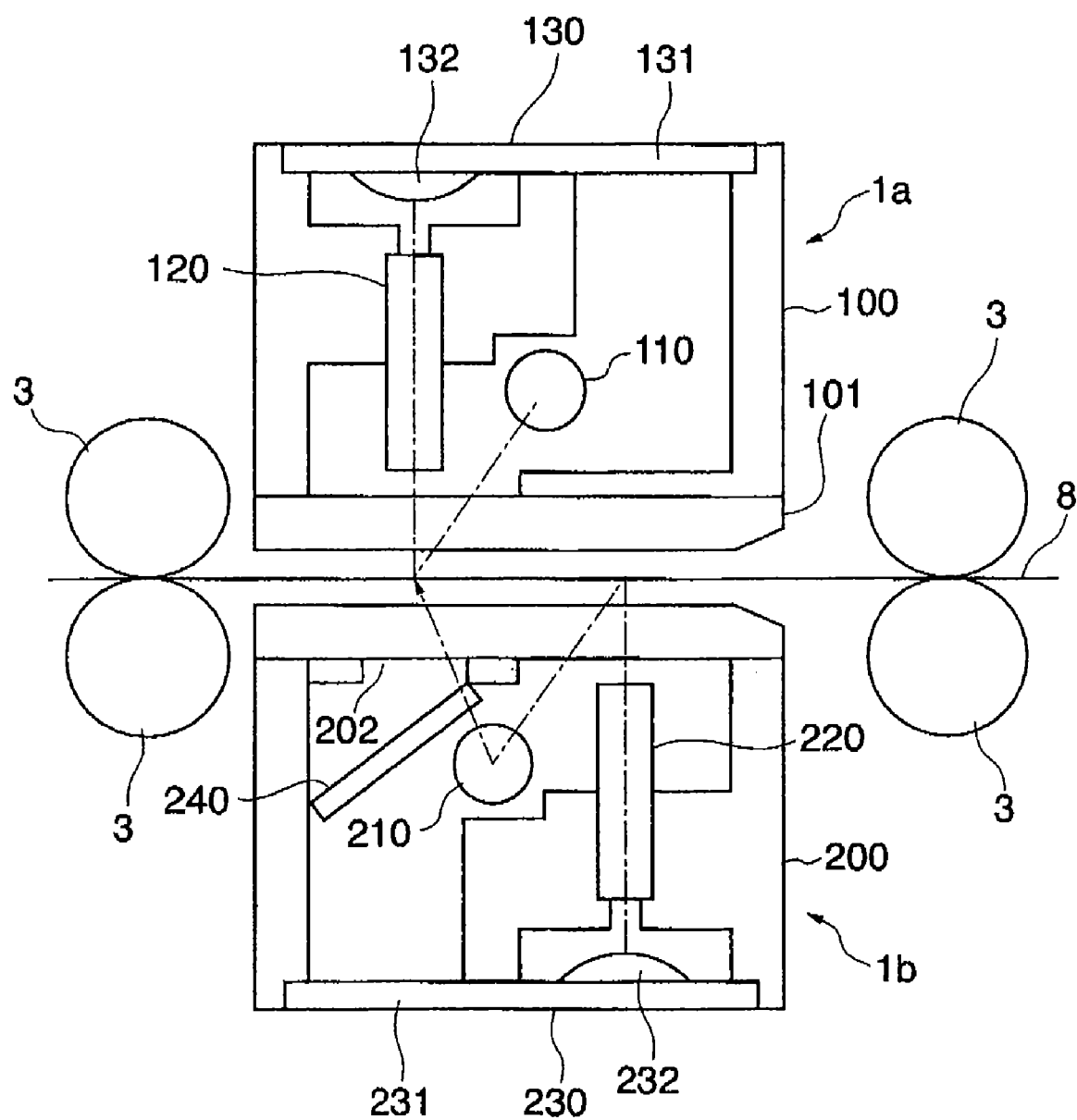
FIG. 7 is a cross-sectional view which is useful in explaining scanning assemblies in an image reading apparatus in accordance with a second embodiment of the present invention.
Figure 8:
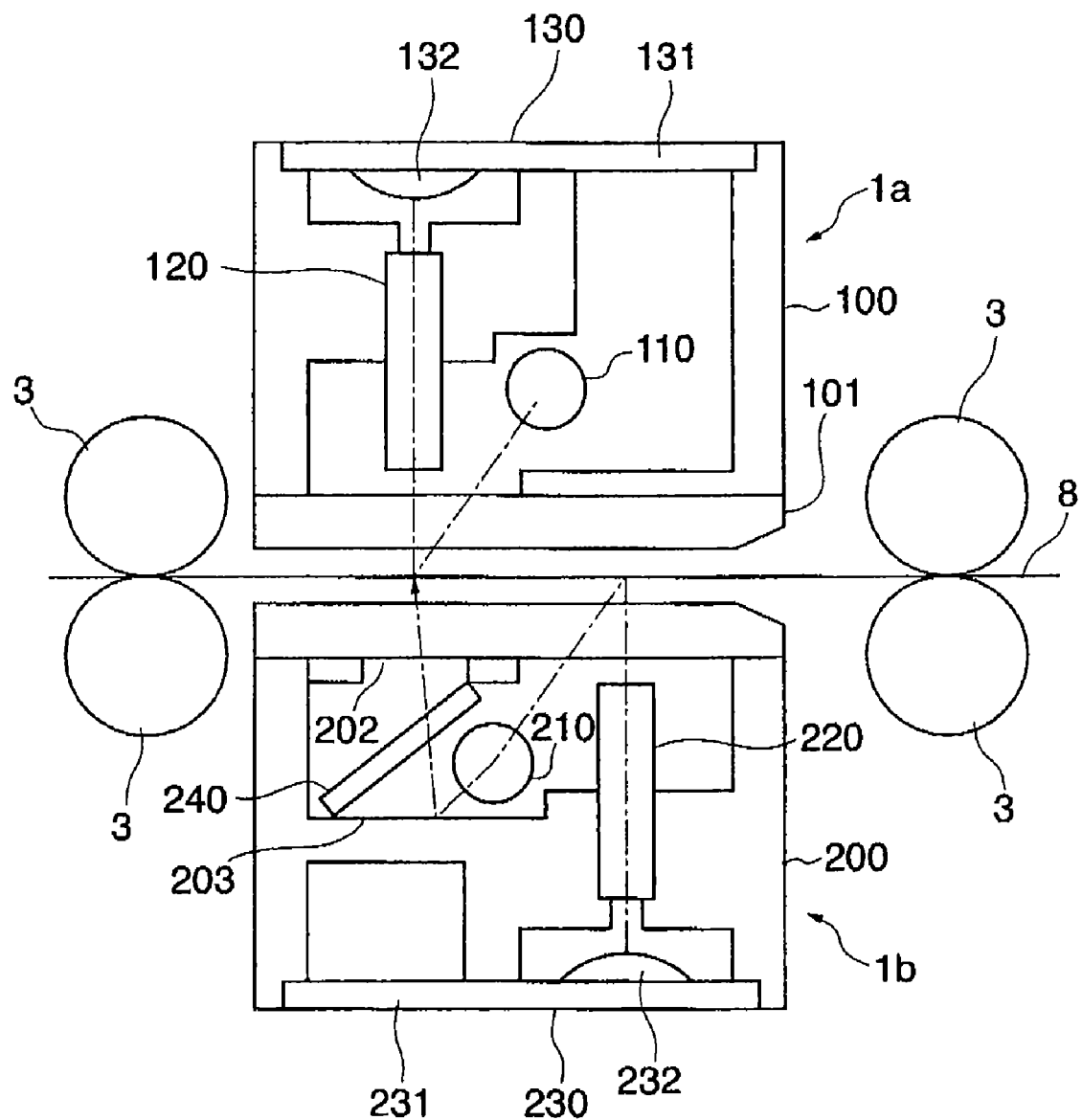
FIG. 8 is a cross-sectional view illustrating modified example of the scanning assemblies in FIG. 7.

Hence, in the present embodiment, a shutter 240 is provided between the light source 210 and the optical opening 202, as shown in FIG. 7, so that the light of the light source 210 reaches the imaging optics 120 from the optical opening 202 only during a period of detecting information on the outline of the original 8. This shutter 240 is controlled by a controller 14. As the shutter 240, a liquid-crystal shutter or the like is preferred from the viewpoint of response speed. In addition, the image reading apparatus may be configured in such a manner that as shown in FIG. 8, light emitted from the light source 210 enters the imaging optics 120 through a reflecting surface 203 disposed in the frame 200. In this case, the rest of the configuration and other operations/advantages are the same as those of the above-described first embodiment.

Although in the present embodiment, the optical opening 202 and the shutter 240 are disposed on the scanning assembly 1b, the optical opening 202 and the shutter 240 may be alternatively disposed on the scanning assembly 1a.

Figure 9:
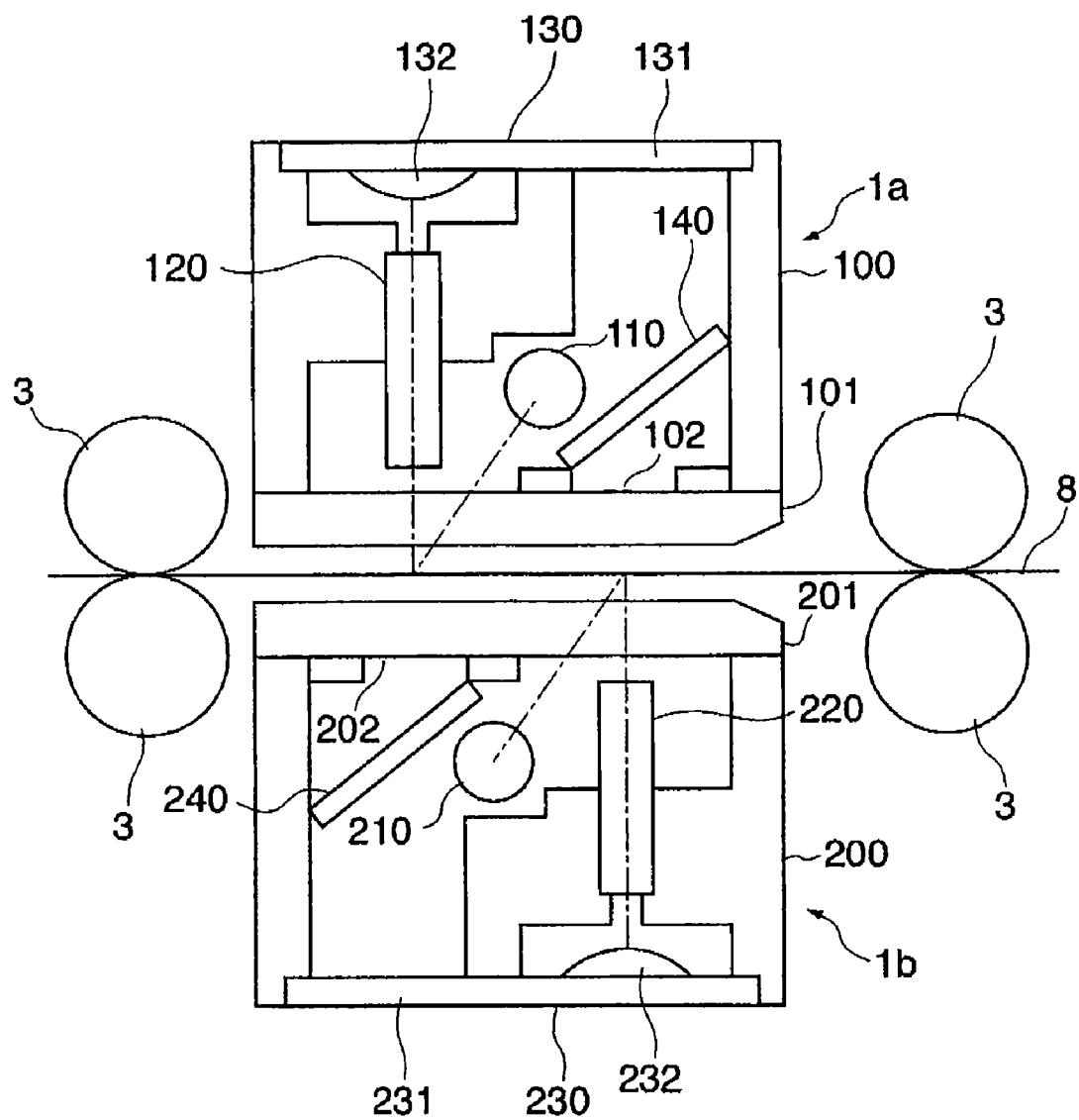
FIG. 9 is a cross-sectional view illustrating another modified example of the scanning assemblies of FIG. 8.
Figure 10:
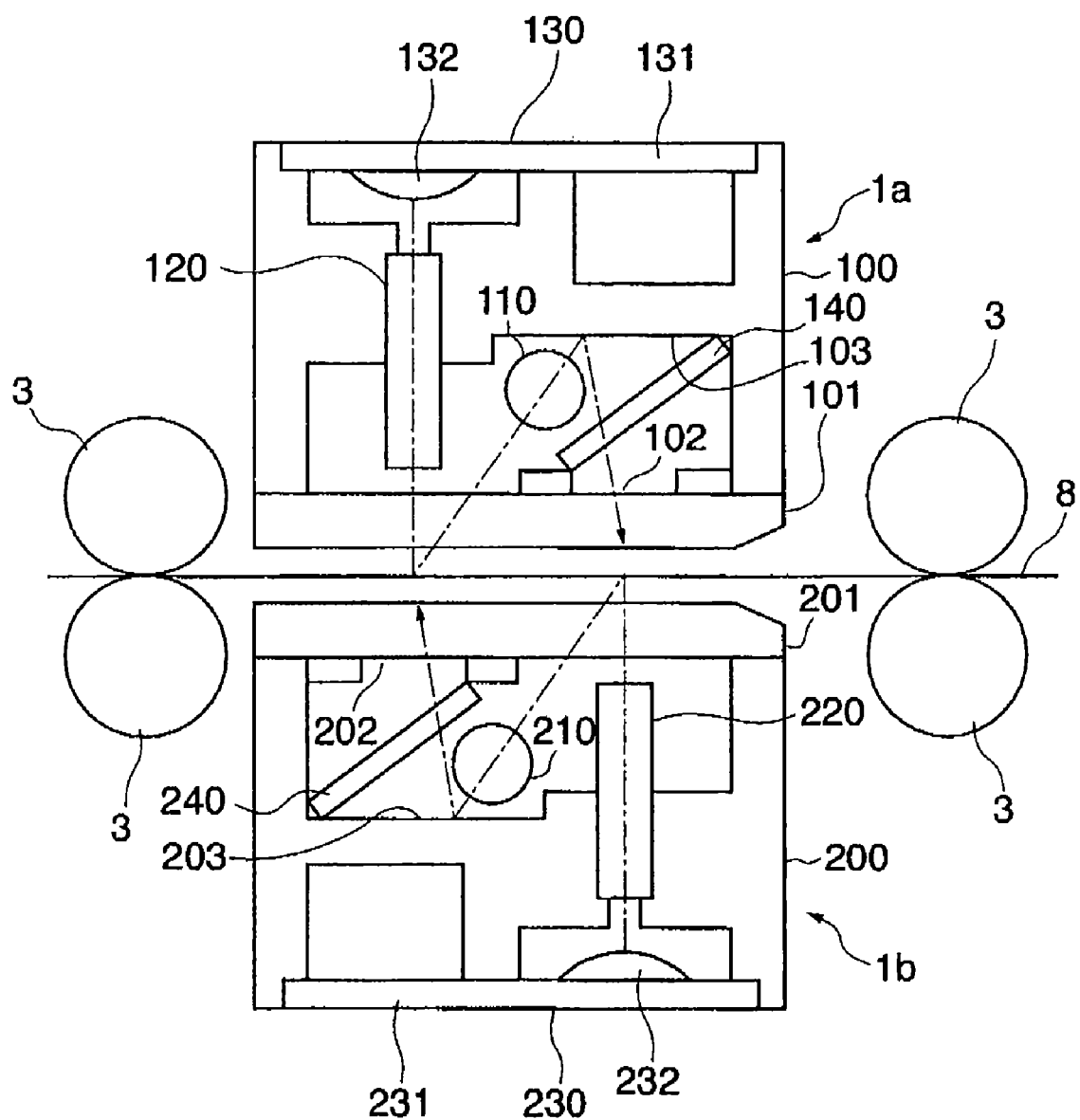
FIG. 10 is a cross-sectional view illustrating a modified example of the scanning assemblies of FIG. 9.

Furthermore, as shown in FIG. 9, optical openings 102 and 202 and shutters 140 and 240 may be respectively disposed in the scanning assemblies 1a and 1b. It is preferable to provide the aforementioned shutter also in the above-described first embodiment if both surfaces of the original need to be read simultaneously. Still further, the image reading apparatus may be configured in such a manner that as shown in FIG. 10, reflecting surfaces 103 and 203 are respectively disposed in the frames 100 and 200, so that parts of light from the light sources 110 and 210 are respectively reflected by the reflecting surfaces 103 and 203 and enter the imaging optics 220 and 120.

Next, a description will be made of an image reading apparatus according to a third embodiment of the present invention, with reference to FIG. 11. An image reading apparatus according to the present embodiment is identical in configuration with the above-described first embodiment, so that similar elements are denoted by same reference numerals in the drawings, and the description thereof will be omitted.

In the present embodiment, LEDs are used as the light sources 110 and 210 of scanning assemblies 1a and 1b and light guides 150 and 250 are used, in order to guide the light emitted from an LED across the full width of the original 8.

Figure 11:
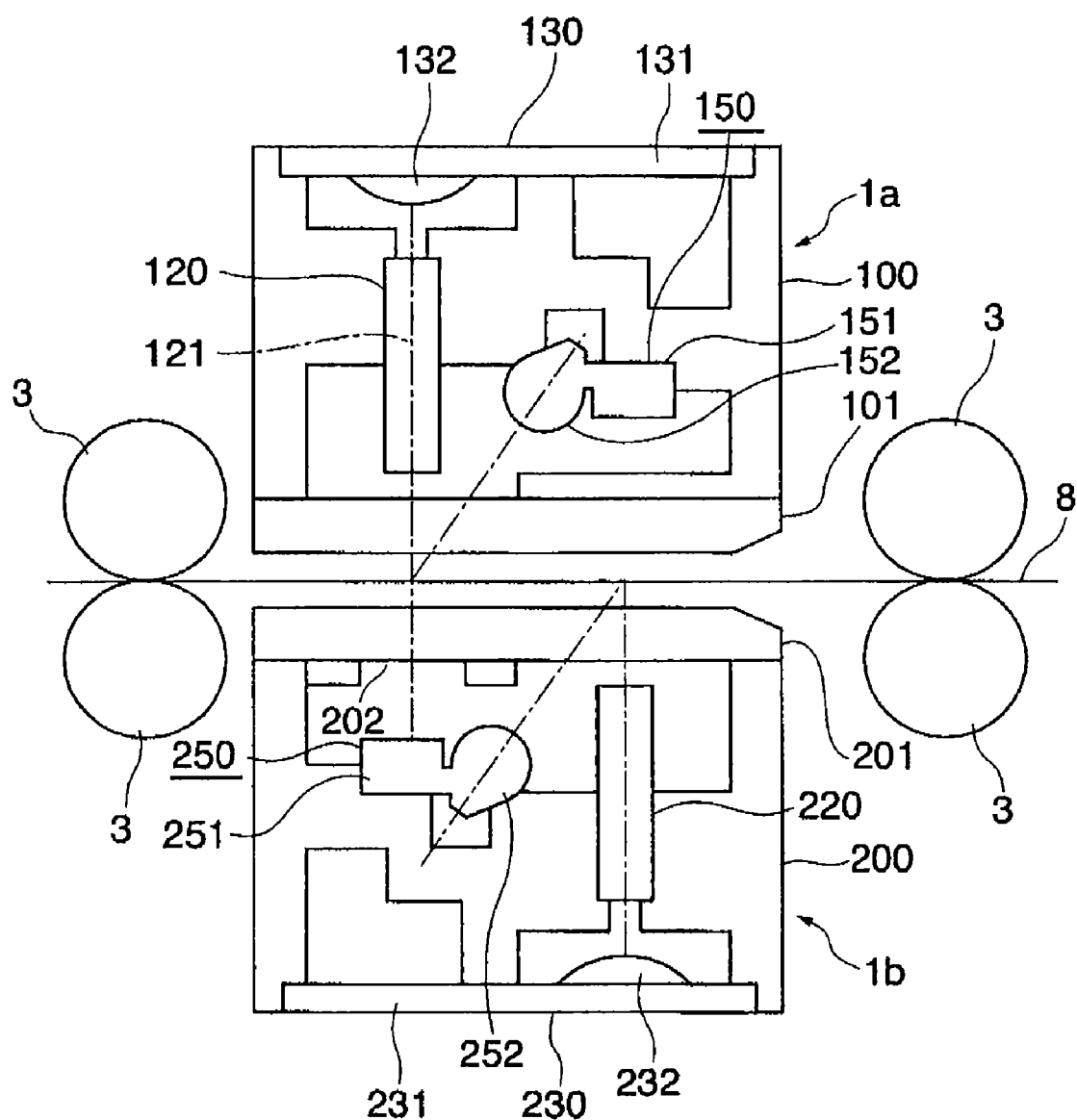
FIG. 11 is a cross-sectional view which is useful in explaining scanning assemblies in an image reading apparatus in accordance with a third embodiment of the present invention.

In FIG. 11, the LEDs (not shown) as light sources are disposed on the near side or far side of the light guides 150 and 250 with respect to the page surface. The light guides 150 and 250 have light-guiding portions 151 and 251 for guiding light across the full reading width of the image sensors 130 and 230 and emitting portions 152 and 252 for emitting light toward the original 8.

In the present embodiment, the light-guiding portion 251 on the scanning assembly 1b is disposed on the optical axis 121 of the imaging optics 120 of the scanning assembly 1a across the optical opening 202 of the scanning assembly 1b. The light-guiding portions 151 and 251 are designed to guide and emit almost all of light beams entering from the LEDs to the emitting portions 152 and 252, and the light-guiding portions 151 and 251 concurrently emit small part of light beams toward the opposite scanning assembly. Also in the present embodiment, the light-guiding portion 251 is disposed on the optical axis 121 of the imaging optics 120 of the scanning assembly 1a, so that light from the light-guiding portion 251 can be utilized as a light source for detecting the outline of the original 8. In addition, the aforementioned light guides include those designed so that there are very small light emissions from the light-guiding portions of the light guides. If even such a light guide as described above fails to completely eliminate light emissions and emits leakage light, this leakage light may be used as the light source.

According to the present embodiment, light from the red, green and blue LEDs of the light source 210 is guided and emitted by the light guide 250 across the full width of the original in the width direction thereof. Consequently, it is possible to even more reliably guide the light into the optical opening 202. The rest of the configuration and other operations/advantages are the same as those of the above-described first embodiment.

Note that in the present embodiment, if the light sources 110 and 210 for illuminating front and back surfaces of original 8 are turned on simultaneously in a case, for example, where the images of both surfaces of the original 8 are read simultaneously, there arises the need for a shutter for blocking light passing through the optical opening 202, as in the above-described second embodiment.

Figure 12:
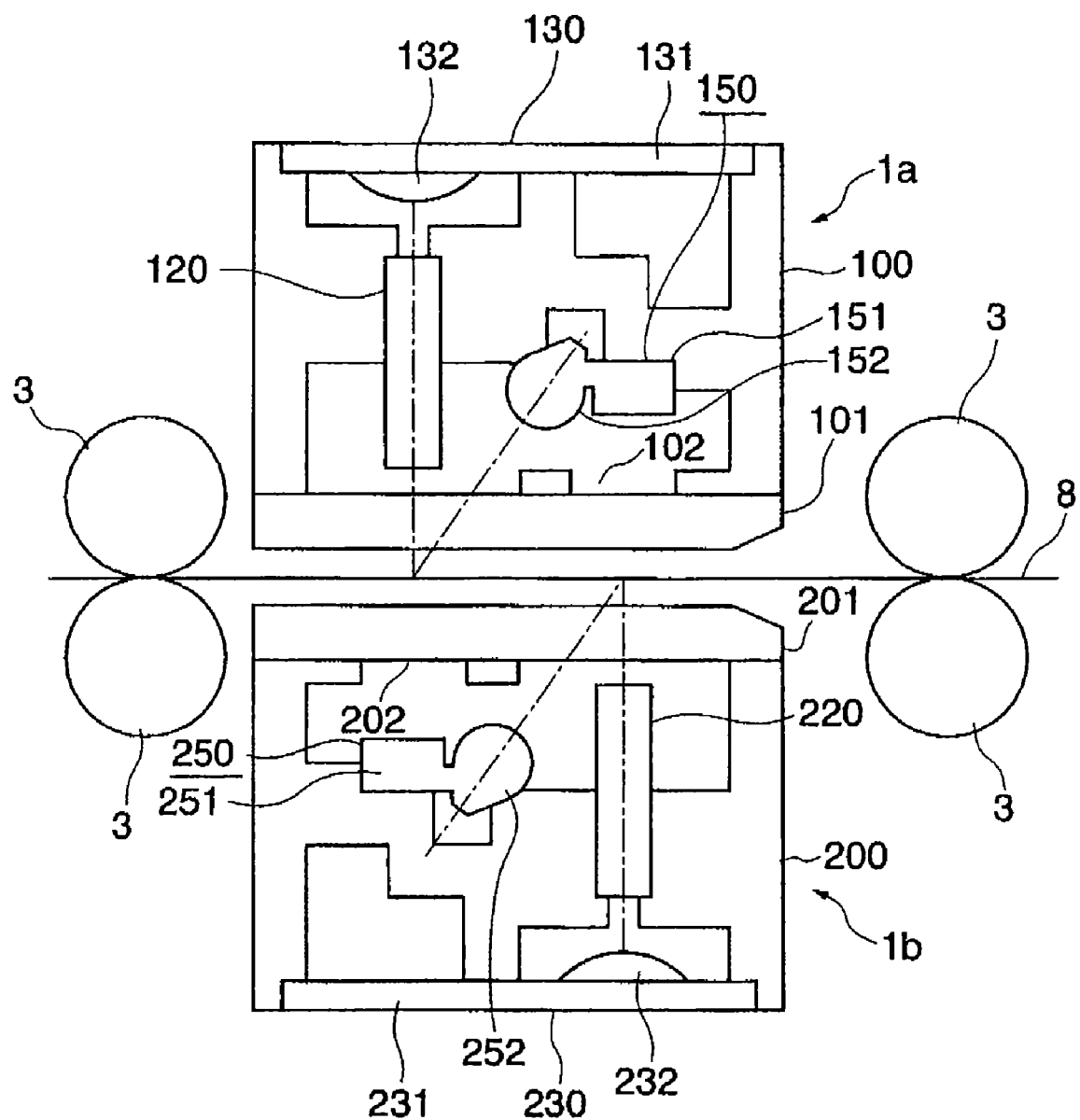
FIG. 12 is a cross-sectional view illustrating a modified example of the scanning assemblies of FIG. 11.

Furthermore, although in the present embodiment, the optical opening 202 is disposed on the scanning assembly 1b, the optical opening may be alternatively provided on the scanning assembly 1a side. Still alternatively, as shown in FIG. 12, optical openings 102 and 202 may be respectively disposed on the scanning assemblies 1a and 1b.

Figure 13:
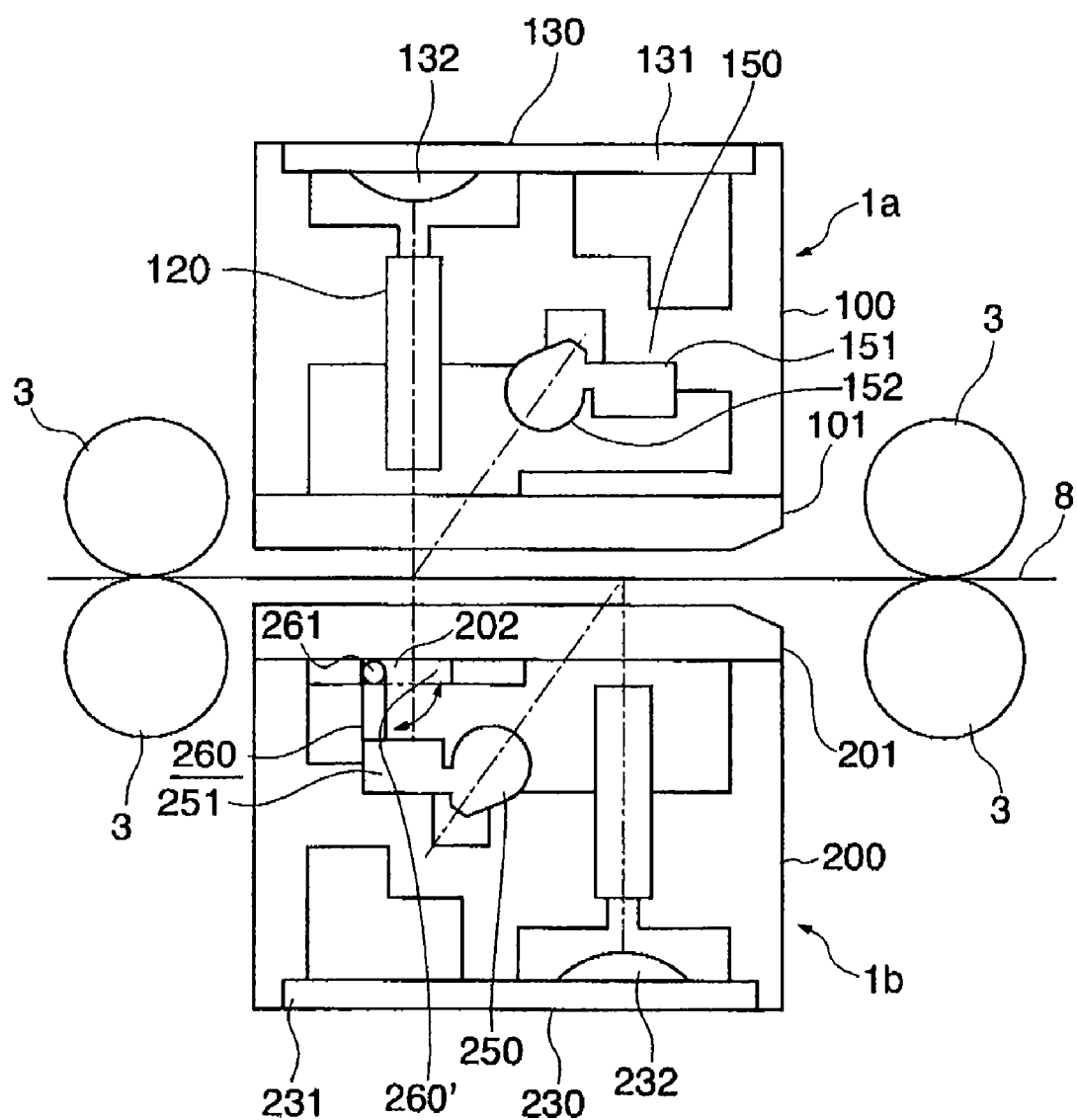
FIG. 13 is a cross-sectional view which is useful in explaining scanning assemblies in an image reading apparatus in accordance with a fourth embodiment of the present invention.

Next, a description will be made of an image reading apparatus according to a fourth embodiment of the present invention, with reference to FIG. 13. An image reading apparatus according to the present embodiment is identical in configuration with the above-described first embodiment, and the scanning assemblies 1a and 1b are identical in basic structure with the above-described third embodiment. Accordingly, similar elements are denoted by same reference numerals in the drawings, and the description thereof will be omitted.

In the present embodiment, a reference member 260 for the purpose of obtaining a shading correction data for correcting the sensitivity variation or the like of the image sensor 130 of the scanning assembly 1a is disposed at a position in which the optical opening 202 of the scanning assembly 1b is located.

The reference member 260 is white or substantially white and is supported on the frame 200 through a rotational shaft 261. In addition, the reference member 260 can be moved between an exposed position 260' at which the image sensor 130 performs reading when obtaining the shading correction data and a retracted position (a position at which the optical opening 202 is opened). The exposed position 260' is a position at which the optical opening 202 is closed. The controller 14 controls an actuator (not shown) such as a motor to openably and closably drive the reference member 260 with the rotational shaft 261 serving as a fulcrum.

In the present embodiment, the image reading apparatus is not only superior in detection accuracy but also capable of carrying out shading correction operation at a correct timing since leakage light from the light-guiding portions 151 and 251 can be utilized as light sources for detecting the outline of the original 8. Consequently, it is possible to always obtain excellent images. The rest of the configuration and other operations/advantages are the same as those of the above-described first embodiment.

Moreover, the purpose of use of the configuration adopted in the present embodiment may be changed from the above-described shading correction to the gain adjustment of an amplifier (not shown) or the adjustment of the light quantity of the light sources, in order to correct the sensitivity of the image sensor.

Figure 14:
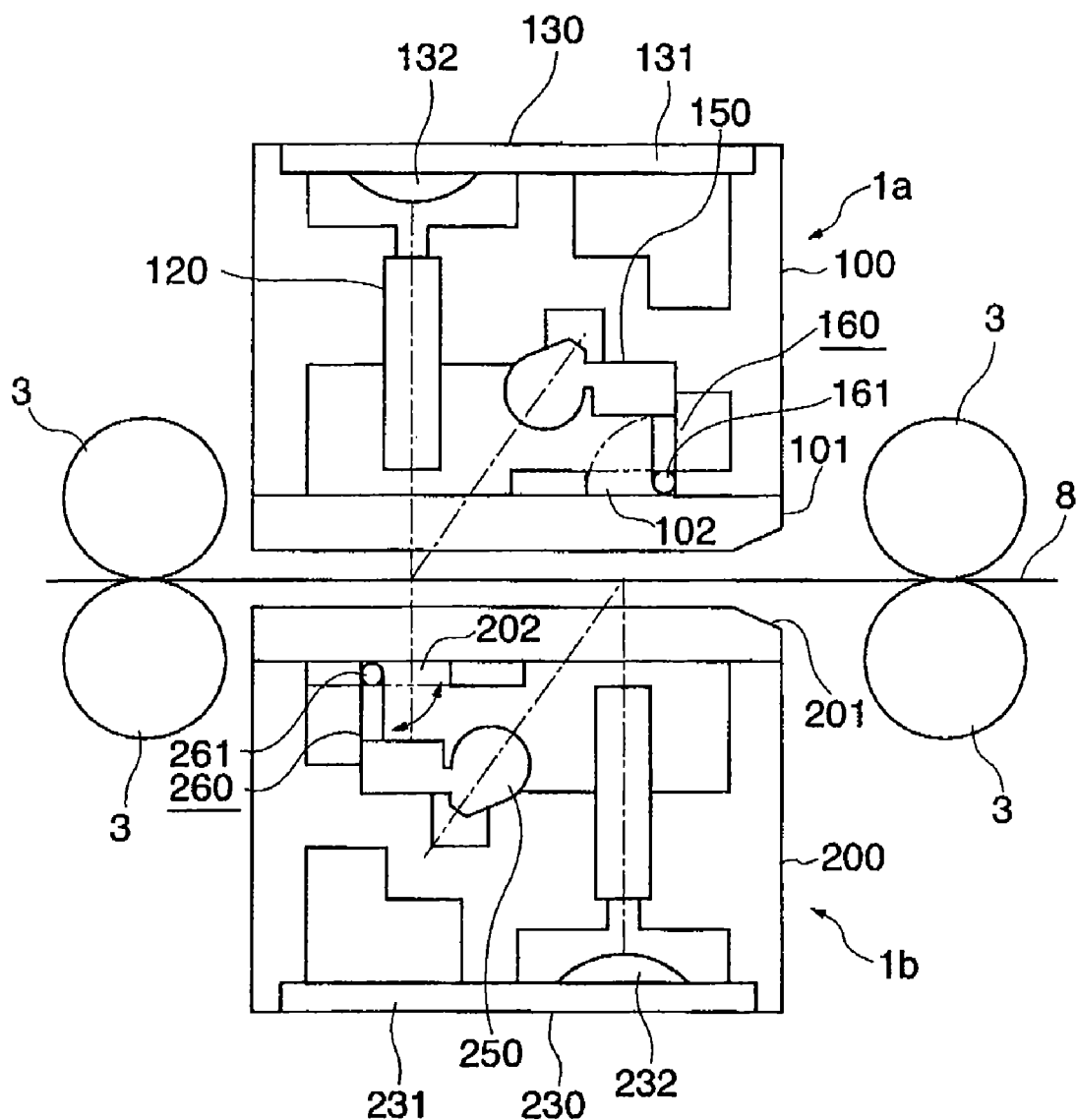
FIG. 14 is a cross-sectional view illustrating a modified example of the scanning assemblies of FIG. 13.

Furthermore, although in the present embodiment, the optical opening 202, the reference member 260 and the rotational axis 261 are disposed on the scanning assembly 1b, another optical opening, reference member and rotational axis may be alternatively disposed on the scanning assembly 1a. Still further, as shown in FIG. 14, the optical openings 102 and 202, the reference members 160 and 260, and the rotational axes 161 and 261 may be disposed respectively in the scanning assemblies 1a and 1b.

Figure 15:
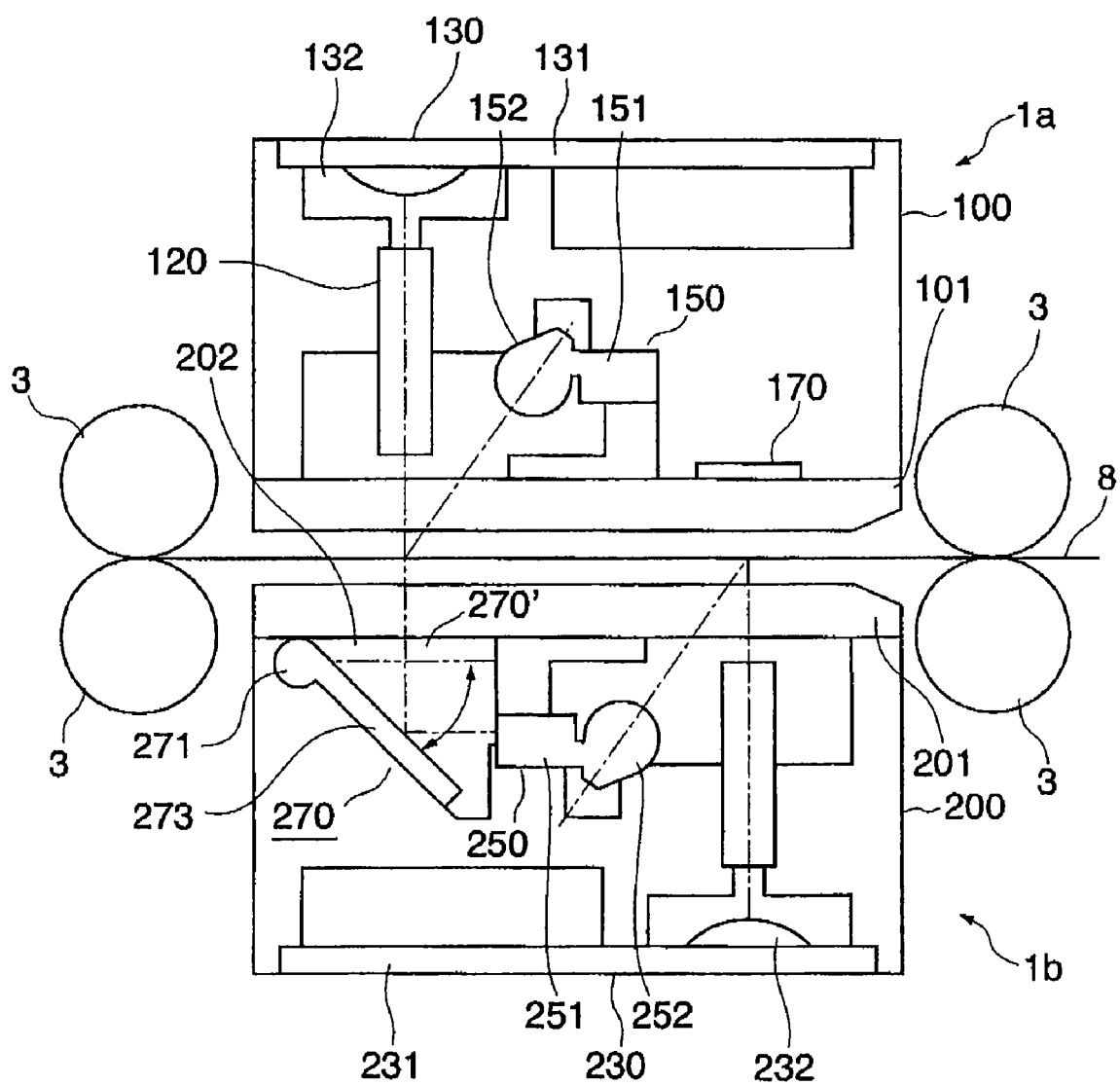
FIG. 15 is a cross-sectional view which is useful in explaining the scanning assemblies in an image reading apparatus in accordance with a fifth embodiment of the present invention.

Next, a description will be made of an image reading apparatus according to a fifth embodiment of the present invention, with reference to FIG. 15. An image reading apparatus according to the present embodiment is identical in configuration with the above-described first embodiment and that the scanning assemblies 1a and 1b are substantially identical in basic structure with the above-described third embodiment. Accordingly, similar elements are denoted by same reference numerals in the drawings, and the descriptions thereof will be omitted.

The present embodiment aims to increase the degree of freedom with respect to a positional relationship between the light guide 250 and the optical opening 202 in the above-described fourth embodiment. That is, the reference member 270 of the scanning assembly 1b is enabled to move to a position at which leakage light from the light guide 250 is reflected toward the imaging optics 120 of the scanning assembly 1a.

A reference member 170 is stationarily placed in the scanning assembly 1a. On the other hand, the reference member 270 of the scanning assembly 1b is pivotally supported on the frame 200 through a rotational axis 271.

The reference member 270 is moved between a reflection position (a position at which the optical opening 202 opens) at which leakage light from the light guide 250 is reflected toward the imaging optics 120 and a correction position 270' at which the shading correction data of the scanning assembly 1a is obtained (a position at which the optical opening 202 is closed). The open-close movement of the reference member 270 is performed by the controller 14 by controlling an actuator (not shown) such as a motor.

According to the present embodiment, it is possible to obtain timely a shading correction data for the scanning assembly 1a by moving the reference member 270 to the correction position as necessary. It is also possible to always obtain excellent images since the image reading apparatus is superior in the accuracy of detecting the outline of the original. In addition, the degree of freedom of disposing respective members composing the scanning assemblies 1a and 1b increases, thus enabling even more optimum design.

Furthermore, since leakage light from the light guide 250 is reflected toward the imaging optics 120 when the reference member 270 is at the reflection position, it is possible to suppress the intensity of lighting by a light source at the time of detecting the outline of the original. Consequently, it is possible to further extend the service life of the light source for illuminating the original.

Still further, since a surface of the reference member 270 scatteringly reflects light, the reference member serves as a light source having a two-dimensional spread of illumination. Consequently, it is possible to uniformize light entering the imaging optics 120 of the opposite scanning assembly 1a, thereby improving the accuracy of detecting the outline of the original. The rest of the configuration and other operations/advantages are the same as those of the above-described first embodiment.

The purpose of use of the configuration adopted in the present embodiment may be changed from the above-described shading correction to the gain adjustment of an unillustrated amplifier or the adjustment of the light quantity of the light sources, in order to correct the sensitivity of an image sensor.

Figure 16:
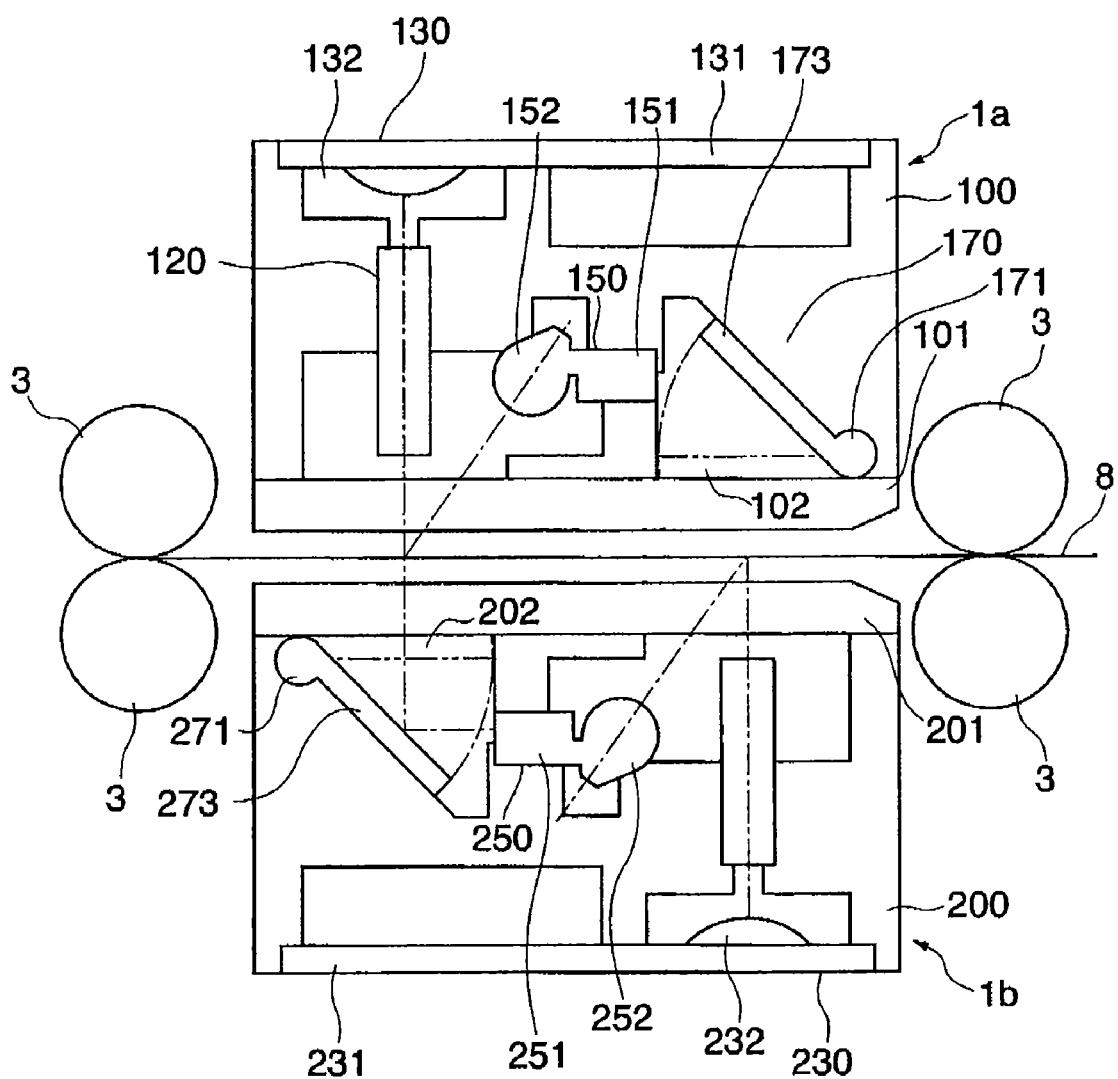
FIG. 16 is a cross-sectional view illustrating a modified example of the scanning assemblies of FIG. 15.

Although in the present embodiment, the optical opening 202, the reference member 270 and the rotational axis 271 are disposed on the scanning assembly 1b, another optical opening, reference member and rotational axis may be alternatively disposed on the scanning assembly 1a. Furthermore, as shown in FIG. 16, the optical openings 102 and 202, the reference members 170 and 270, and the rotational axes 171 and 271 may be respectively disposed in the scanning assemblies 1a and 1b.

Furthermore, even higher-accuracy detection is possible if a scanning assembly, which does not read the original at the time of single-side reading, is used exclusively as a sensor for detecting the outline of the original in a configuration in which both scanning assemblies 1a and 1b can be used as sensors for detecting the outline of the original. In addition, there is no need to use the image sensor for reading the original in a time-shared manner in order to detect the outline of the original, thereby making it possible to increase reading speed or enhance image quality. In the above-described first to fifth embodiments, a translucent member may be disposed in a through-hole of the frame 200 so as to serve as an optical opening. Alternatively, the optical opening part of the frame 200 may be formed of a translucent material.

Figure 17:
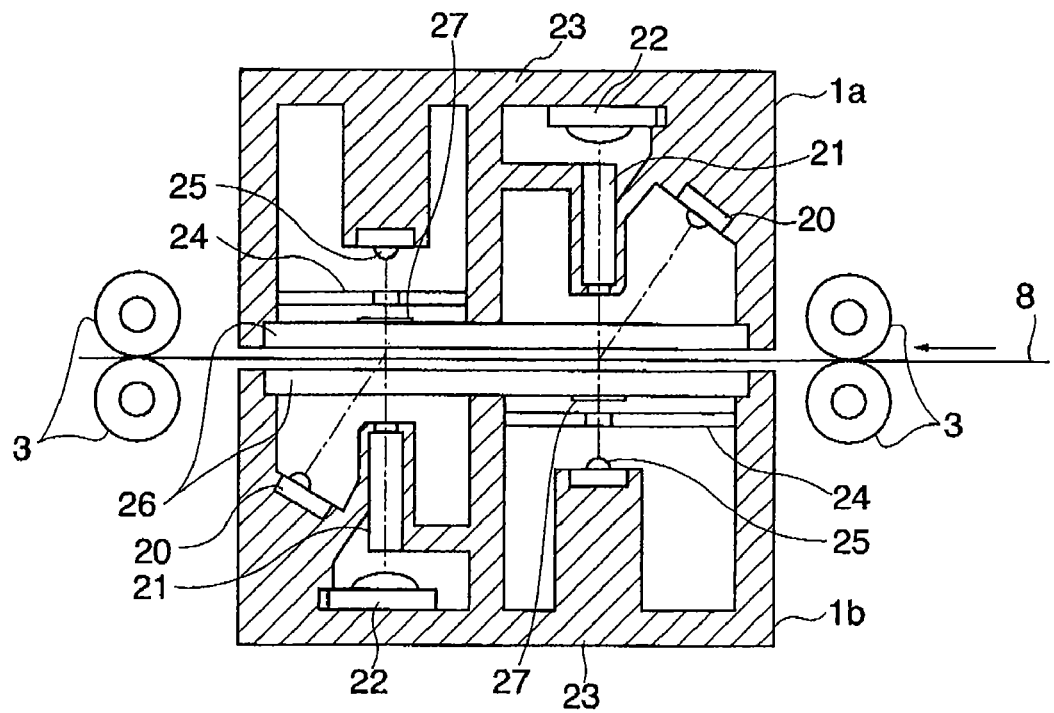
FIG. 17 is a cross-sectional view which is useful in explaining scanning assemblies in an image reading apparatus in accordance with a sixth embodiment of the present invention.

Next, a description will be made of an image reading apparatus according to a sixth embodiment of the present invention, with reference to FIG. 17. An image reading apparatus of the present embodiment is identical in configuration with the above-described first embodiment, and the description thereof will be, therefore, omitted.

Since the scanning assemblies 1a and 1b of the present embodiment are substantially the same in configuration with each other, only the scanning assembly 1a will be explained.

Within the frame 23 of the scanning assembly 1a, there are disposed an LED array 20 which is a first light source, a lens array 21 which is an optical system for forming reflected light from an original 8 into an image, a photoelectric conversion element 22 for converting incident imaging light into an electrical signal, an LED serving as a second light source, and an illuminator 25 such as a LED or fluorescent lamp. Light from the illuminator 25 is prevented by a slit 24 from scattering.

The illuminator 25 of the scanning assembly 1a is disposed on the optical axis of the lens array 21 of the scanning assembly 1b, and the illuminator 25 of the scanning assembly 1b is disposed on the optical axis of the lens array 21 of the scanning assembly 1a.

The illuminator 25 need not be necessarily disposed on the optical axis of the lens array 21 of an opposite scanning assembly. Alternatively, the emitted light may be guided onto the optical axis of the lens array 21 using a light guide (not shown). In this case, the light guide and the illuminator compose the second light source of the present invention.

A side of the frame 23 facing the conveyance path 10 is covered by a cover member 26 made of glass, resin or the like. On the rear surface of the cover member 26 of the scanning assembly 1a, there is disposed a white or substantially white reference member 27, so as to be positioned on the optical axis of the lens array 21 of the scanning assembly 1b. On the rear surface of the cover member 26 of the scanning assembly 1b, there is provided a white or substantially white reference member 27, so as to be positioned on the optical axis of the lens array 21 of the scanning assembly 1a. Consequently, shading correction data can be obtained by turning on the LED array 20 and reading the reference member 27 with the photoelectric conversion element 22.

The controller 14 causes the illuminators 25 of the scanning assemblies 1a and 1b to emit light in a predetermined time after the original 8 passes through a registration sensor (not shown). Since the reference member 27 of the present embodiment has a certain degree of optical transmittance, light emitted from the illuminator 25 and having transmitted through the reference member 27 enters the lens array 21 of an opposite scanning assembly and is converted into an electrical signal by the photoelectric conversion element 22.

After that, the original 8 being conveyed blocks light transmitting through the reference member 27 and entering the lens array 21. As a result, the level of an electrical signal, which is output from the photoelectric conversion element 22 by photoelectrically converting the light of the illuminator 25, drastically changes. Thus, the controller 14 can reliably detect the edges of the original 8 on the basis of information on this level change.

As described heretofore, according to the present embodiment, the edges of the original 8 are detected as a result of the light of the illuminator 25 having transmitted through the reference member 27 being blocked by the original 8. Consequently, it is possible to increase the accuracy of detecting the original 8.

In addition, since it is possible to detect the edges of the original 8 by utilizing the lens array 21 and the photoelectric conversion element 22 of the scanning assembly 1*b* for reading the rear surface image of the original 8, there is no need for another image sensor dedicated to detecting originals. Accordingly, it is possible to reduce the size and cost of the image reading apparatus.

Although in the present embodiment, the illuminators 25 are respectively disposed in the scanning assemblies 1*a* and 1*b*, the illuminator 25 may be disposed only in either one of the scanning assemblies 1*a* and 1*b*.

Figure 18:
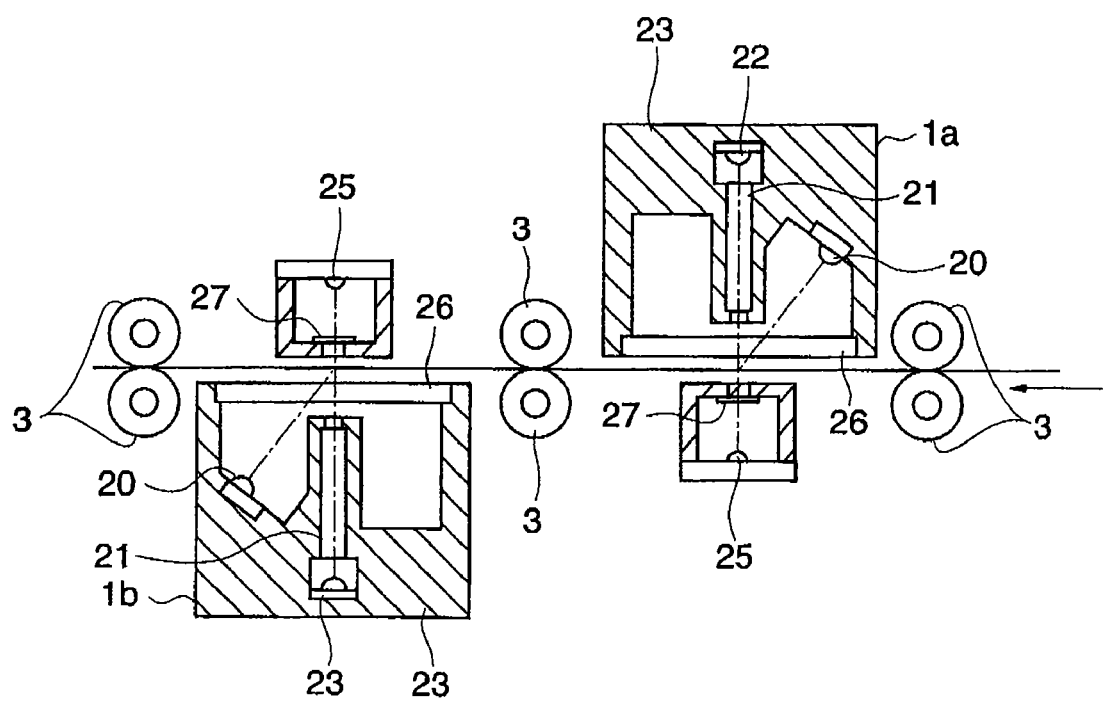
FIG. 18 is a cross-sectional view illustrating a modified example of the scanning assemblies of FIG. 17.

Alternatively, as shown in FIG. 18, the illuminators 25 and the reference members 27 may be disposed in separate units other than the scanning assemblies 1*a* and 1*b*.

Furthermore, the edges of the original 8 are preferably detected in a continuous manner while reading images. In this case, the edges of the original are detected in a time-shared manner each time a single line of an image is read or several lines of the image are read, so that a period of time during which the LED array 20 which is the first light source is turned on to perform image reading and a period of time during which the illuminators 25 are caused to emit light to detect the edges of the original do not coincide with each other. This means that the illuminators 25, which are the second light sources, are turned on preferably only when the LED arrays 20, which are the first light sources, are turned off. Otherwise, when the light emitted by the first light sources is not effective for image reading even in a period of time during which the first light sources are turned on, the second light sources may be turned on.

When, for example, detecting a time at which the leading end of the original passes through an image sensor or detecting the skew of the leading end of the original before image reading is started, the illuminators 25 may be caused to emit light in a continuous manner. When reading only one surface of the original 8, the above-described time sharing is unnecessary if a scanning assembly not used for reading is used exclusively for the purpose of detecting the edges of the original 8. It is expected that improvements in detection accuracy and in the quality of read images will be achieved.

In addition, it is preferable that infrared light is used for the illuminator 25 and the reference member 27 is an infrared transmissive member. It is further preferable that the material or the thickness of the reference member 27 is altered to further increase the degree of whiteness thereof, so that the reference member 27 allows infrared light to pass therethrough but not visible light. Consequently, by reading an image using the reference member 27 as a background member, it is possible to further emphasize a light-colored character, such as a penciled character, written on an original. It is also possible to reliably detect the edges of the original since infrared light from the illuminator 25 transmits through the reference member 27.

Figure 19:
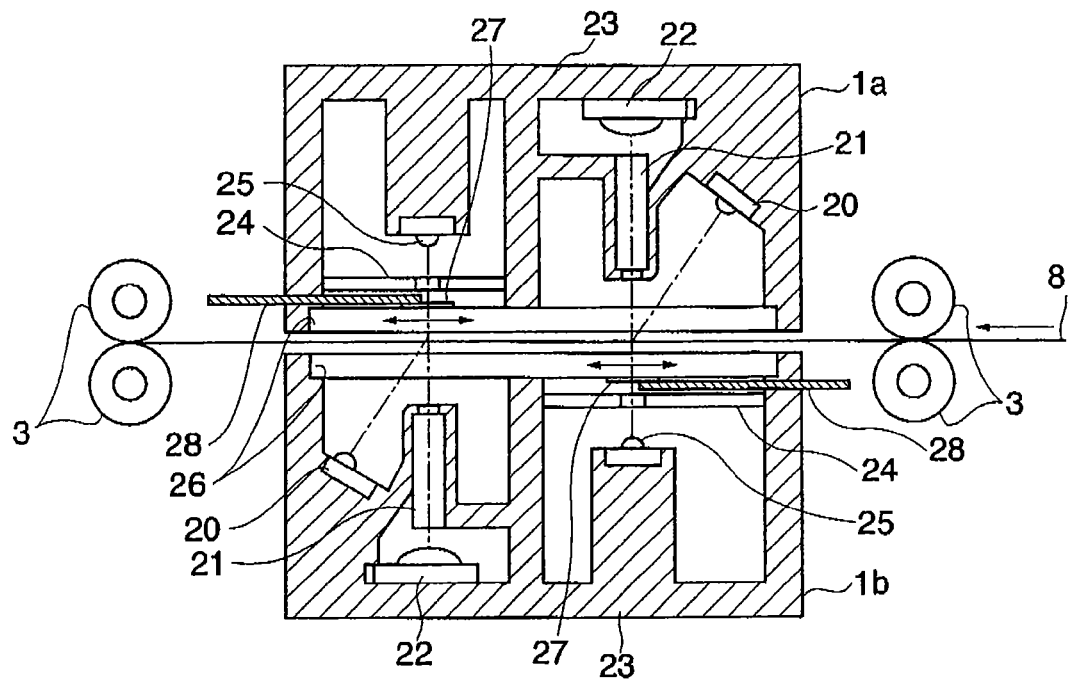
FIG. 19 is a cross-sectional view which is useful in explaining scanning assemblies in an image reading apparatus in accordance with a seventh embodiment of the present invention.

Next, a description will be made of an image reading apparatus according to a seventh embodiment of the present invention, with reference to FIG. 19. An image reading apparatus according to the present embodiment is identical in configuration with the above-described first embodiment, and that the scanning assemblies 1*a* and 1*b* are substantially identical in basic structure with the above-described sixth embodiment. Accordingly, similar elements are denoted by same reference numerals in the drawings, and the description thereof will be omitted.

In the present embodiment, a reference member 27 disposed on the back surface of a cover member 26 is protrudingly mounted at the leading end of a moving member 28. By driving the moving member 28 in the directions of two-headed arrow in the drawing using a moving unit (not shown), such as a solenoid, the reference member 27 is enabled to move between a blocking position for blocking the light of an illuminator 25 and a retracted position.

When the reference member 27 is at a position for blocking the light of the illuminator 25, it is possible to obtain shading correction data. When the reference member 27 is at a retracted position for not blocking the light of the illuminator 25, the illuminator 25 is turned on to detect the edges of the original 8.

Consequently, it is possible to use a low light transmittance reference member 27 having an even higher degree of whiteness, compared with the above-described sixth embodiment. By using this reference member as a background member at the time of image reading, it is possible to further emphasize a light-colored character, such as a penciled character, written on the original.

In addition, by turning on the illuminator 25 at a position to which the reference member 27 is retracted from the position for blocking the light of the illuminator 25, it is possible to reliably detect the edges of the original, no matter what type of light, including infrared light and visible light, the light emitted by the illuminator 25 is. Furthermore, since the color of the background member at the time of image reading can be changed to black by setting the color of the moving member 28 to black, it is possible to reduce a show-through image of thin paper or the like. The rest of the configuration and other operations/advantages are the same as those of the above-described sixth embodiment.

The spectral characteristics of the LED array 20 which is the first light source and the spectral characteristics of the illuminator 25 which is the second light source may differ from each other. For example, the light emitted by the illuminator 25 is changed to infrared light in a case where the LED array 20 is changed to a continuously-lit white light source, such as a cold-cathode fluorescent lamp or a light source of arbitrary visible-light, and some elements of the photoelectric conversion element 22 are changed to those capable of detecting infrared light only.

This makes it possible to detect the edges of the original without being affected by the white light and the like of the LED array 20 for reasons of a difference in wavelength between white light emitted by the LED array 20 and infrared light emitted by the illuminator 25.

In addition, the spectral characteristics of light emitted by the illuminator 25 of the scanning assembly 1*a* and the spectral characteristics of light emitted by the illuminator 25 of the scanning assembly 1*b* may differ from each other. For example, a short-wavelength blue light source is used for the illuminator 25 of the scanning assembly 1*a* and an infrared light source is used for the illuminator 25 of the scanning assembly 1*b*.

This makes it possible to even more reliably detect the edges of an original by, for example, cross-checking data detected using two light sources having different spectral characteristics, even in the case of a stack of originals or the like composed of a mixture of thin and thick sheets of paper. Thus, it is possible to further improve detection accuracy. In addition, it is possible to optionally combine sources of red light, green light, blue light, infrared light and the like in accordance with the inherent color of an original.

Figure 20:
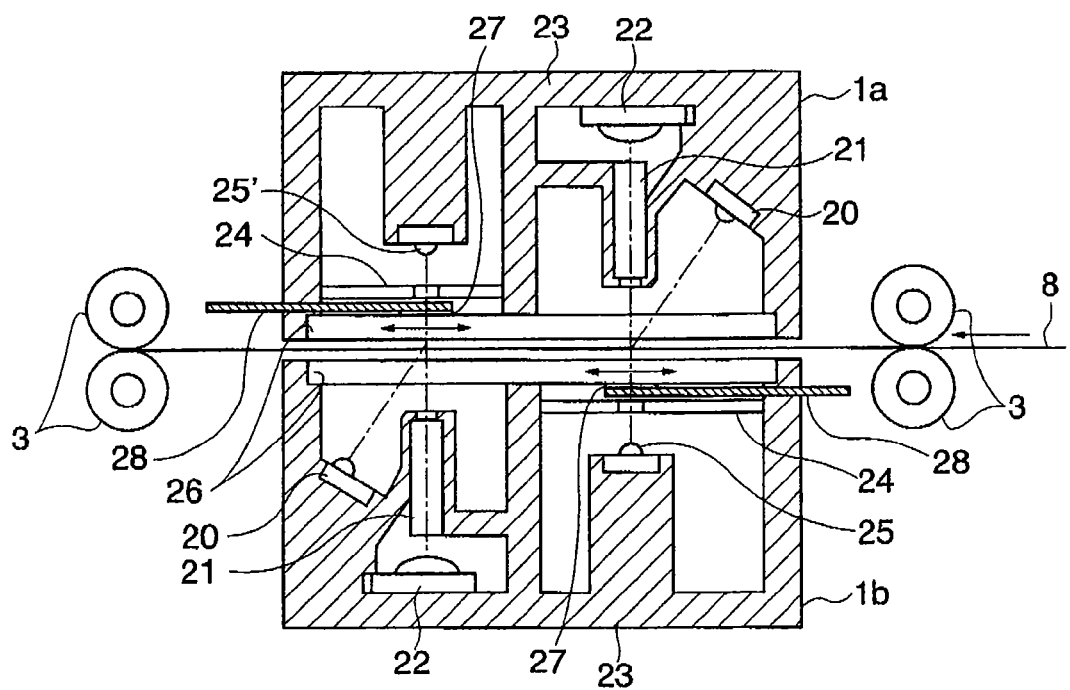
FIG. 20 is a cross-sectional view which is useful in explaining scanning assemblies in an image reading apparatus in accordance with an eighth embodiment of the present invention.

Next, a description will be made of an image reading apparatus according to an eighth embodiment of the present invention, with reference to FIG. 20. An image reading apparatus of the present embodiment is identical in configuration with the above-described first embodiment, and that the scanning assemblies 1*a* and 1*b* are substantially identical in basic structure with the above-described sixth embodiment. Accordingly, similar elements are denoted by same reference numerals in the drawings, the description thereof will be omitted.

In the present embodiment, a reference member 27 is disposed on the rear surface of a cover member 26 so as to overlap with the leading end of a moving member (black-colored member) 28 formed of a light transmissive black material. By driving the moving member 28 in the directions of two-headed arrow in the drawing using a moving unit (not shown), such as a solenoid, the reference member 27 is enabled to move between a blocking position for blocking the light of an illuminator 25 and a retracted position.

Consequently, shading correction data can be obtained when the reference member 27 is at a position for blocking the light of the illuminator 25. In addition, by using the reference member 27 as a background member at the time of image reading, it is possible to further emphasize a light-colored character, such as a penciled character, written on the original.

Furthermore, since the color of the background member is black when the moving member 28 is arranged at the position for blocking the light of the illuminator 25 to perform image reading, it is possible to reduce a show-through image of thin paper or the like.

Still further, it is possible to change the density of a background color to a desirable one by previously varying the density, which the moving member 28 has, according to a position in the moving direction thereof and by moving the moving member 28 as appropriate, so that a portion with a different density color is positioned on the optical axis line of a lens array 21. The rest of the configuration and other operations/advantages are the same as those of the above-described sixth embodiment. In addition, it is possible to detect the edges of an original or the like using light from the illuminator 25 having passed through the moving member 28.

The moving member 28 may be changed to a stationary member and the reference member 27 overlapped on the stationary member may be moved, without mounting the reference member 27 on the stationary member. In this case, it is possible to detect the edges of an original or the like using light from the illuminator 25 having passed through the stationary member when the reference member 21 is retracted from the optical axis of the lens array 21. Alternatively, the reference member may be fixed to the scanning assembly 1b and a moving unit for moving at least either one of the scanning assemblies 1b and 1a may be provided. With this arrangement, changing the relative position of the scanning assemblies 1b and 1a enables to locate the reference member at the reading position of the scanning assembly 1a, and to locate the optical opening of the scanning assembly 1b at the reading position of the scanning assembly 1a by controlling the moving unit using a controller or the like. Alternatively, another reference member may be further fixed to the scanning assembly 1a and an optical opening is also disposed in the scanning assembly 1a. With this arrangement, it is possible to locate the above-described another reference member at the reading position of the scanning assembly 1b by controlling the moving unit, and to locate the optical opening of the scanning assembly 1a at the reading position of the scanning assembly 1b by controlling the moving unit.

Still alternatively, the illuminator 25 of only one of the scanning assemblies 1a and 1b may be turned on and the other of the scanning assemblies 1a and 1b may be dedicated to detecting the edges of an original. This makes it possible to save electrical power as the illuminator 25 of the other scanning assembly is not turned on.

Furthermore, by dedicating the other image sensor to detecting the edges of an original, it is possible to smoothly process images read by one scanning assembly. Consequently, it is possible to suppress a decrease in the speed of image reading due to processing for the detection of the edges of an original.

In addition, since there is no need for time-sharing between light emission for the purpose of image reading and light emission for the purpose of detecting the edges of an original, it is possible to improve the quality of read images. Note that in each of the above-described embodiments, the reference member may be used for the gain adjustment of an amplifier (not shown) or for the adjustment of the light quantity of the light source, rather than using the reference member to obtain shading correction data.

It is to be understood that the present invention is not limited to the foregoing embodiments described by way of example but may be modified as appropriate without departing from the subject matter thereof. The foregoing embodiments of the present invention may be modified by adding any constituent feature or features included in each of the embodiments to another embodiment.

It is also to be understood that the object of the present invention may also be accomplished by supplying a system or an apparatus with a storage medium in which a program code of software which realizes the functions of the above-described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magneto-optic disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above-described embodiment may be accomplished not only by executing a program code read out by a computer, but also by causing an OS (operating system) or the like which operates on the computer to perform a part or all of the actual operations based on instructions of the program code.

Further, it is to be understood that the functions of the above-described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-283478, filed Oct. 31, 2007, which is hereby incorporated by reference herein in its entirety.

What is claimed is:

1. An image reading apparatus comprising:
   a first reading unit disposed on one side of a conveyance path of an original and having a first light source for emitting light to one surface of the original, and adapted to receive the light emitted from the first light source and subsequently reflected at the one surface of the original and adapted to read an image of the original;

a second reading unit disposed on the other side of the conveyance path and having a second light source for emitting light to be received by said first reading unit, an optical opening for causing the light emitted from the second light source and subsequently received by said first reading unit to pass therethrough toward said first reading unit, and a reference member disposed so as to be movable between a position at which the optical opening is closed and a position at which the optical opening opens and to be read by said first reading unit, and adapted to receive the light emitted from said second light source and subsequently reflected at the other surface of the original and adapted to read the image of the original; and a control unit adapted to provide a control of detecting the original on the basis of the resultant output of said first reading unit upon receipt of the light emitted from said second light source.

2. An image reading apparatus according to claim 1, wherein the light emitted from said second light source and subsequently received by said first reading unit enters into said first reading unit through at least one reflecting surface.

3. An image reading apparatus according to claim 1, wherein said reference member reflects the light from said second light source toward said first reading unit when located at a position in which the optical opening opens.

4. An image reading apparatus comprising:

a first reading unit disposed on one side of a conveyance path of an original and having a first light source for emitting light to one surface of the original, and adapted to receive the light emitted from the first light source and subsequently reflected at the one surface of the original and adapted to read an image of the original;

a second reading unit disposed on the other side of the conveyance path having a second light source for emitting light to be received by said first reading unit, an optical opening for causing the light emitted from the second light source and subsequently received by said first reading unit to pass therethrough toward said first reading unit, and a reference member to be read by said first reading unit, and adapted to receive the light emitted from said second light source and subsequently reflected at the other surface of the original and adapted to read the image of said original;

a moving unit adapted to move at least one of said first reading unit and said second reading unit so as to change a relative position of said first reading unit and said second reading unit; and a control unit adapted to control said moving unit to change said relative position between one relative position at which said optical opening is opposed to said first reading unit and the other relative position at which said reference member is opposed to first reading unit, and adapted to provide a control of detecting the original on the basis of the resultant output of said first reading unit upon receipt of the light having passed through said optical opening.

5. An image reading apparatus comprising:

a reading unit disposed on one side of a conveyance path of an original and having a first light source for emitting light to one surface of the original and adapted to receive the light emitted from the first light source and subsequently reflected at the one surface of the original and adapted to read an image of the original;

a second light source disposed on the other side of the conveyance path for emitting light to be received by said reading unit;

a reference member disposed on an optical path from said second light source to said reading unit so as to be read by said reading unit;

a black-colored member disposed so as to overlap with said reference member and formed of a light transmissive black material;

a moving unit adapted to move said reference member only or both of said reference member and said black-colored member, such that said reference member or said black-colored member is located at a position for blocking the light of said second light source; and a control unit adapted to provide a control of detecting the original on the basis of the resultant output of said reading unit upon receipt of the light transmitted through said black-colored member.

6. An image reading apparatus comprising:

a reading unit disposed on one side of a conveyance path of an original and having a first light source for emitting light to one surface of the original, and adapted to receive the light emitted from the first light source and subsequently reflected at the one surface of the original and adapted to read an image of the original;

a second light source disposed on the other side of the conveyance path for emitting light to be received by said reading unit; and a control unit adapted to perform a detection of an edge of the original on the basis of the resultant output of said reading unit upon receipt of the light emitted from said second light source, wherein the edge of the original is detected based on the resultant output obtained during a period of time between a scanning time of a partial image of the original and a scanning time of the next partial image of the same original.

7. An image reading apparatus according to claim 6, wherein said control unit provides a control of controlling said second light source to emit the light in a period of time different from a period of time during which said reading unit receives the light emitted from said first light source to said original.

8. An image reading apparatus comprising:

a reading unit disposed on one side of a conveyance path of an original having a first light source for emitting light to one surface of the original, and adapted to receive the light emitted from the first light source and subsequently reflected at the one surface of the original and adapted to read an image of the original;

a second light source disposed on the other side of the conveyance path for emitting light to be received by said reading unit;

a control unit adapted to provide a control of controlling said second light source to emit the light in a period time different from a period of time during which said reading unit receives the light emitted from said first light source to said original, and adapted to provide a control of detecting original on the basis of the resultant output of said reading unit upon receipt of the light emitted from said second light source; and another reading unit adapted to receive the light emitted from said second light source and subsequently reflected at the other surface of the original and adapted to read the image of the original, wherein said control unit is adapted to provide a control of controlling said first light source to emit the light in a period of time different from a period of time during which said another reading unit receives the light emitted from said second light source, and adapted to provide a control of detecting the original on the basis of the resultant output of said another reading unit upon receipt of the light emitted from said first light source.

9. A control method for controlling an image reading apparatus comprising a reading unit disposed on one side of a conveyance path of an original and having a first light source for emitting light to one surface of the original, and adapted to receive the light emitted from the first light source and subsequently reflected at the one surface of the original, and adapted to read the image of the original; and a second light source disposed on the other side of said conveyance path to emit light to be received by said reading unit, wherein said control method is adapted to perform a detection of an edge of the original on the basis of the resultant output of said reading unit upon receipt of the light emitted from said second light source, and the edge of the original is detected based on the resultant output obtained during a period of time between a scanning time of a partial image of the original and a scanning time of next partial image of the same original.

10. A computer-readable storage medium storing a program for causing a computer to implement a control method for controlling an image reading apparatus comprising a reading unit disposed on one side of a conveyance path of an original and having a first light source for emitting light to one surface of the original, and adapted to receive the light emitted from the first light source and subsequently reflected at the one surface of the original, and adapted to read an image of said original, and a second light source disposed on the other side of said conveyance path to emit light to be received by said reading unit, wherein said control method is adapted to perform a detection of an edge of the original on the basis of the resultant output of said reading unit upon receipt of the light emitted from said second light source, and the edge of the original is detected based on the resultant output obtained during a period of time between a scanning time of a partial image of the original and a scanning time of next partial image of the same original.

11. An image reading apparatus comprising:

a first reading unit disposed on one side of a conveyance path of an original having a first light source for emitting light to one surface of the original, and adapted to receive the light emitted from the first light source and subsequently reflected at the one surface of the original and adapted to read an image of the original;

a second reading unit disposed on the other side of the conveyance path having a second light source for emitting light to be received by said first reading unit, an optical opening for causing the light emitted from the second light source and subsequently received by said first reading unit to pass therethrough toward said first reading unit, and a movable member disposed so as to be movable between a position at which the optical opening is closed and a position at which the optical opening opens and so as to be read by said first reading unit, and adapted to receive the light emitted from said second light source and subsequently reflected at the other surface of the original and adapted to read the image of the original; and a control unit adapted to provide a control of detecting an edge of the original on the basis of the resultant output of said first reading unit upon receipt of the light emitted from said second light source.

12. An image reading apparatus comprising:

a first reading unit disposed on one side of a conveyance path of an original having a first light source for emitting light to one surface of the original, and adapted to receive the light emitted from the first light source and subsequently reflected at the one surface of the original and adapted to read an image of the original;

a second reading unit disposed on the other side of the conveyance path having a second light source for emitting light to be received by said first reading unit, and an optical opening for causing the light emitted from the second light source and subsequently received by said first reading unit to pass therethrough toward said first reading unit, and adapted to receive the light emitted from said second light source and subsequently reflected at the other surface of the original and adapted to read the image of said original;

a moving unit adapted to move at least one of said first reading unit and said second reading unit so as to change a relative position of said first reading unit and said second reading unit; and a control unit adapted to control said moving unit to change said relative position such that on one relative position, in which said optical opening is opposed to said first reading unit, and on the other relative position, in which a portion of said second reading unit different from said optical opening is opposed to first reading unit, and adapted to detect an edge of the original on the basis of the resultant output of said first reading unit upon receipt of the light passed through said optical opening.

13. An image reading apparatus comprising:

a reading unit disposed on one side of a conveyance path of an original having a first light source for emitting light to one surface of the original, and adapted to receive the light emitted from the first light source and subsequently reflected at the one surface of the original and adapted to read an image of the original;

a second light source disposed on the other side of the conveyance path for emitting light to be received by said reading unit;

another reading unit adapted to receive the light emitted from said second light source and subsequently reflected at the other surface of the original and adapted to read the image of the original; and a control unit adapted to detect an edge of the original on the basis of the resultant output of said reading unit upon receipt of the light emitted from said second light source, wherein the edge of the original is detected based on the resultant output obtained during a period of time between a scanning time of a partial image of the original and a scanning time of next partial image of the same original.

* * * * *